United States Patent
Zhang et al.

(10) Patent No.: US 9,106,295 B1
(45) Date of Patent: *Aug. 11, 2015

(54) REUSE OF A MATRIX EQUALIZER FOR THE PURPOSE OF TRANSMIT BEAMFORMING IN A WIRELESS MIMO COMMUNICATION SYSTEM

(75) Inventors: Hongyuan Zhang, Fremont, CA (US); Leilei Song, Sunnyvale, CA (US); Rohit U. Nabar, Sunnyvale, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,298

(22) Filed: Jul. 16, 2012

Related U.S. Application Data

(63) Continuation of application No. 12/098,222, filed on Apr. 4, 2008, now Pat. No. 8,223,872.

(60) Provisional application No. 60/910,104, filed on Apr. 4, 2007, provisional application No. 60/939,959, filed on May 24, 2007.

(51) Int. Cl.
*H04B 7/00* (2006.01)
*H04B 7/06* (2006.01)
*H04L 25/03* (2006.01)

(52) U.S. Cl.
CPC ........ *H04B 7/0626* (2013.01); *H04L 25/03949* (2013.01)

(58) Field of Classification Search
CPC .. H04B 7/0626; H04B 7/0632; H04B 7/0643; H04L 2025/03802; H04L 25/03891; H04L 25/03949; H04L 1/0681

USPC ......... 375/343, 267, 229, 340; 455/67.16, 69, 455/101, 63.1; 370/437
See application file for complete search history.

(56) References Cited

U.S. PATENT DOCUMENTS

| | | |
|---|---|---|
| 6,324,220 B1 | 11/2001 | Sellars |
| 6,760,388 B2 | 7/2004 | Ketchum et al. |
| 6,829,297 B2 | 12/2004 | Xia et al. |
| 6,834,109 B1 | 12/2004 | Lin et al. |
| 7,065,144 B2 | 6/2006 | Walton et al. |

(Continued)

FOREIGN PATENT DOCUMENTS

| | | |
|---|---|---|
| WO | WO-2007/035993 A1 | 4/2007 |
| WO | WO-2007/037716 A1 | 4/2007 |
| WO | WO 2007/037716 A1 | 4/2007 |

OTHER PUBLICATIONS

U.S. Appl. No. 11/598,563, filed Nov. 13, 2006, Nabar et al.

(Continued)

*Primary Examiner* — Aristocratis Fotakis

(57) ABSTRACT

An equalizer is applied to a signal to be transmitted via at least one multiple input, multiple output (MIMO) channel or received via at least one MIMO channel using a matrix equalizer computational device. Channel state information (CSI) is received, and the CSI is provided as an input to the matrix equalizer computational device when the matrix equalizer computational device is not needed for matrix equalization. One or more transmit beamsteering codewords are selected from a transmit beamsteering codebook based on output generated by the matrix equalizer computational device in response to the CSI input to the matrix equalizer computational device.

25 Claims, 17 Drawing Sheets

(56) References Cited

U.S. PATENT DOCUMENTS

| | | | |
|---|---|---|---|
| 7,065,146 B1 | 6/2006 | Lou et al. |
| 7,170,926 B2 | 1/2007 | Zeira |
| 7,280,625 B2 | 10/2007 | Ketchum et al. |
| 7,333,540 B2 | 2/2008 | Yee |
| 7,336,727 B2 | 2/2008 | Mukkavilli et al. |
| 7,386,076 B2 | 6/2008 | Onggosanusi et al. |
| 7,397,758 B1 | 7/2008 | Hart et al. |
| 7,430,245 B2 | 9/2008 | Ketchum et al. |
| 7,433,402 B2 | 10/2008 | Al-Dhahir et al. |
| 7,483,505 B2 | 1/2009 | Wang et al. |
| 7,486,655 B2 | 2/2009 | Ting et al. |
| 7,502,408 B2 | 3/2009 | Kim et al. |
| 7,599,332 B2 | 10/2009 | Zelst et al. |
| 7,599,444 B2 | 10/2009 | Ashikhmin |
| 7,616,695 B1 | 11/2009 | Sarrigeorgidis |
| 7,616,955 B2 | 11/2009 | Kim |
| 7,627,286 B2 | 12/2009 | Webster et al. |
| 7,639,759 B2 | 12/2009 | Chen |
| 7,649,955 B2 | 1/2010 | Lin et al. |
| 7,742,390 B2 | 6/2010 | Mujtaba |
| 7,813,421 B2 | 10/2010 | Sarrigeorgidis |
| 7,907,913 B2 | 3/2011 | Lee et al. |
| 7,912,140 B2 | 3/2011 | Anholt et al. |
| 7,933,353 B2 | 4/2011 | Maltsev et al. |
| 7,991,090 B2 | 8/2011 | Kim et al. |
| 8,073,069 B2 | 12/2011 | Mundarath et al. |
| 8,081,692 B1 | 12/2011 | Zhang et al. |
| 8,165,543 B2 | 4/2012 | Rohit et al. |
| 8,199,841 B1 | 6/2012 | Sarrigeorgidis et al. |
| 8,223,872 B1 | 7/2012 | Zhang et al. |
| 8,265,209 B2 | 9/2012 | Kim |
| 8,311,160 B1* | 11/2012 | Zhang ............ 375/340 |
| 8,320,301 B2 | 11/2012 | Walton et al. |
| 8,374,273 B1 | 2/2013 | Zhang et al. |
| 8,442,138 B2 | 5/2013 | Zhang et al. |
| 8,494,084 B1 | 7/2013 | Nabar et al. |
| 8,498,361 B1 | 7/2013 | Sarrigeorgidis et al. |
| 8,630,376 B1* | 1/2014 | Zhang ............ 375/340 |
| 8,706,048 B2 | 4/2014 | Kim |
| 8,731,039 B1 | 5/2014 | Sarrigeorgidis et al. |
| 8,897,393 B1* | 11/2014 | Zhang et al. ......... 375/316 |
| 2002/0186762 A1 | 12/2002 | Xia et al. |
| 2003/0108117 A1 | 6/2003 | Ketchum et al. |
| 2004/0165684 A1 | 8/2004 | Ketchum et al. |
| 2004/0235529 A1 | 11/2004 | Tarokh et al. |
| 2005/0041763 A1 | 2/2005 | Wang et al. |
| 2005/0047515 A1 | 3/2005 | Walton et al. |
| 2006/0045193 A1 | 3/2006 | Stolpman et al. |
| 2006/0239366 A1 | 10/2006 | Kim et al. |
| 2006/0270352 A1 | 11/2006 | Webster et al. |
| 2006/0274849 A1 | 12/2006 | Ketchum et al. |
| 2007/0129018 A1 | 6/2007 | Trainin et al. |
| 2007/0165737 A1 | 7/2007 | Sarrigeorgidis |
| 2007/0206626 A1 | 9/2007 | Lee et al. |
| 2007/0226287 A1 | 9/2007 | Lin et al. |
| 2007/0230373 A1 | 10/2007 | Li et al. |
| 2007/0258536 A1 | 11/2007 | Kim et al. |
| 2008/0014870 A1 | 1/2008 | Kim |
| 2008/0045153 A1 | 2/2008 | Surineni et al. |
| 2008/0165875 A1 | 7/2008 | Mundarath et al. |
| 2008/0219343 A1 | 9/2008 | Wu et al. |
| 2008/0219376 A1* | 9/2008 | Qi et al. ............ 375/285 |
| 2008/0266176 A1 | 10/2008 | Nabar et al. |
| 2009/0080560 A1 | 3/2009 | Na et al. |
| 2009/0158109 A1* | 6/2009 | Park et al. ......... 714/748 |
| 2009/0310656 A1 | 12/2009 | Maltsev et al. |

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

Non-Final Office Action mailed May 26, 2010 (U.S. Appl. No. 11/598,563).

Final Office Action mailed Nov. 17, 2010 (U.S. Appl. No. 11/598,563).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

Non-Final Office Action mailed Apr. 27, 2011 (U.S. Appl. No. 12/111,129).

Sarrigeorgidis et al., U.S. Appl. No. 12/111,129, filed Apr. 28, 2008.

Zhang et al., U.S. Appl. No. 12/059,846, filed Mar. 31, 2008.

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, Nov. 7, 2001.

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.

"Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," IEEE Std. 802.11g/D8.2, Apr. 2003.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: High-speed Physical Layer in the 5 GHz Band," IEEE Std. 802.11a, 1999.

"Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHz Band," IEEE Std. 802.11b, 1999.

IEEE Standard for Local and metropolitan area networks: Part 16: Air Interface for Fixed Broadband Wireless Access Systems—Amendment 2: Medium Access Control Modifications and Additional Physical Layer Specifications for 2-11 GHz, IEEE Std. 802.16a 2003, Apr. 1, 2003.

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 Ghz Band," *The Institute of Electrical and Electronics Engineers, Inc.*, pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information

(56) References Cited

OTHER PUBLICATIONS exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirement Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.16/2004 (Revision of IEEE Std 802.16-2001), "IEEE Standard for Local and metropolitan area networks; Part 16: Air Interface for Fixed Broadband Wireless Access Systems," *The Institute of Electrical and Electronics Engineers, Inc.*, 893 pages (Oct. 1, 2004).

IEEE Std 802.16a-2003 (Amendment to IEEE Std 802.16/2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHZ," *The Institute of Electrical and Electronics Engineers, Inc.*, pp. 1-292 (Apr. 1, 2003).

IEEE Std 802.16e-2005 and IEEE Std 802.16-2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Nabar, et al., "Reuse of Matrix Equalizer for the Purpose of Transmit Beamforming in a Wireless MIMO Communication System," U.S. Appl. No. 13/948,001, filed Jul. 22, 2013.

Sarrigeorgidis, et al, "Channel Tracking in a Wireless Multiple-Input Multiple-Output (MIMO) Communication System," U.S. Appl. No. 14/281,635, filed May 19, 2014.

van Nee, et al. "The 802.11n MIMO-OFDM Standard for Wireless LAN and Beyond," Wireless Personal Communications, vol. 37, pp. 445-453 (Jun. 2006).

Notice of Allowance in U.S. Appl. No. 12/111,129, dated Nov. 8, 2011 (8 pages).

Notice of Allowance in U.S. Appl. No. 12/111,129, dated Feb. 8, 2012 (8 pages).

Office Action in U.S. Appl. No. 13/953,710, dated Sep. 11, 2013 (9 pages).

Notice of Allowance in U.S. Appl. No. 13/953,710, dated Jan. 6, 2014 (11 pages).

Office Action in U.S. Appl. No. 11/598,563, dated Dec. 7, 2012 (23 pages).

Notice of Allowance in U.S. Appl. No. 11/598,563, dated Mar. 21, 2013 (10 pages).

Office Action in U.S. Appl. No. 13/493,160, dated Oct. 30, 2012 (44 pages).

Notice of Allowance in U.S. Appl. No. 13/493,160, dated Mar. 21, 2013 (10 pages).

Office Action in U.S. Appl. No. 13/948,001, dated Dec. 3, 2013 (21 pages).

Office Action in U.S. Appl. No. 13/948,001, dated Jun. 13, 2014 (21 pages).

Office Action in U.S. Appl. No. 13/948,001, dated Oct. 24, 2014 (21 pages).

Office Action in U.S. Appl. No. 14/281,635, dated Sep. 24, 2014 (10 pages).

\* cited by examiner

REUSE OF A MATRIX EQUALIZER FOR THE PURPOSE OF TRANSMIT BEAMFORMING IN A WIRELESS MIMO COMMUNICATION SYSTEM

CROSS-REFERENCES TO RELATED APPLICATIONS

The present application is a continuation of U.S. patent application Ser. No. 12/098,222, entitled "REUSE OF A MATRIX EQUALIZER FOR THE PURPOSE OF TRANSMIT BEAMFORMING IN A WIRELESS MIMO COMMUNICATION SYSTEM," filed on Apr. 4, 2008, now U.S. Pat. No. 8,223,872, which claims the benefit of U.S. Provisional Application No. 60/910,104, entitled "Reusing the MIMO Equalization (MEQ) Block to Realize the Codebook Selection Algorithm in Transmit Beamformed MIMO-OFDM Systems," filed on Apr. 4, 2007, and also claims the benefit of U.S. Provisional Application No. 60/939,959, entitled "Reusing the MIMO Equalization (MEQ) Block to Realize the Codebook Selection Algorithm in Transmit Beamformed MIMO-OFDM Systems," filed on May 24, 2007. All of the above-referenced patent applications are hereby incorporated by reference herein in their entireties.

FIELD OF TECHNOLOGY

The present disclosure relates generally to wireless communication systems and, more particularly, to an apparatus and method for performing beamforming calculations for a multiple-input, multiple-output wireless communication system.

DESCRIPTION OF THE RELATED ART

An ever-increasing number of relatively cheap, low power wireless data communication services, networks and devices have been made available over the past number of years, promising near wire speed transmission and reliability. Various wireless technology is described in detail in the 802.11 IEEE Standard, including for example, the IEEE Standard 802.11a (1999) and its updates and amendments, the IEEE Standard 802.11g (2003), as well as the IEEE Standard 802.11n now in the process of being adopted, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation or OFDM encoded symbols mapped up to a 64 quadrature amplitude modulation (QAM) multi-carrier constellation. Generally speaking, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Generally, transmitters used in the wireless communication systems that are compliant with the aforementioned 802.11a/802.11g/802.11n standards as well as other standards such as the 802.16a IEEE Standard, perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards generally include an RF receiving unit that performs RF downconversion and filtering of the received signals (which may be performed in one or more stages), and a baseband processor unit that processes the OFDM encoded symbols bearing the data of interest. Generally, the digital form of each OFDM symbol presented in the frequency domain is recovered after baseband downconverting, conventional analog to digital conversion and Fast Fourier Transformation of the received time domain analog signal. Thereafter, the baseband processor performs demodulation (phase rotation) and frequency domain equalization (FEQ) to recover the transmitted symbols, and these symbols are then processed in a viterbi decoder to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information defining or describing one or more characteristics about each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality objectives, such as those defined by a desired frame error rate (FER), latency criteria, etc.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. Generally speaking, the use of MIMO technology produces significant increases in spectral efficiency and link reliability, and these benefits generally increase as the number of transmission and receive antennas within the MIMO system increases.

In addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the various different transmission and receive antennas to form separate spatial channels on which additional information is sent, better transmission and reception properties can be obtained in a MIMO system by using each of the various transmission antennas of the MIMO system to transmit the same signal while phasing (and amplifying) this signal as it is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better transmission reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmitter antennas to produce high gain lobes in particular or predetermined directions. These techniques include, for example, transmit-MRC (maximum ratio combining) and singular value decomposition (SVD). While it is known to perform beamforming in a MIMO system in a manner that uses all of the available receiver and transmitter antennas in the MIMO system, which thereby maximizes transmission reliability, the calculations and processing overhead associated with computing the beamsteering coefficients or the steering matrix increases significantly as the number of transmission and receiver antennas increases. As a result, beamforming in a MIMO system may significantly increase the system complexity and processing overhead when a large number of transmission and receiver antennas are present.

SUMMARY

In one embodiment, a method includes applying an equalizer to a signal to be transmitted via at least one multiple input, multiple output (MIMO) channel or received via at least one MIMO channel using a matrix equalizer computational device. The method also includes receiving channel state information (CSI), and providing the CSI as an input to the matrix equalizer computational device when the matrix equalizer computational device is not needed for matrix equalization. The method additionally includes selecting one or more transmit beamsteering codewords from a transmit beamsteering codebook based on output generated by the matrix equalizer computational device in response to the CSI input to the matrix equalizer computational device.

In another embodiment, an apparatus comprises a matrix equalizer, and a multiplexer coupled to an input of the matrix equalizer, the multiplexer to select between data on which equalization is to be applied and channel state information (CSI). Additionally, the apparatus comprises codeword selection logic coupled to the matrix equalizer, the codeword selection logic to generate an indication of one or more selected beamsteering codewords from a codebook.

In yet another embodiment, a method of wirelessly receiving a first information signal and transmitting a second information signal within a communication system having a transmitter with a plurality of transmission antennas and one or more receivers includes demodulating the first information signal to produce a demodulated signal, and applying an equalizer to the demodulated signal using a matrix equalizer computational device. The method additionally includes receiving channel state information (CSI), and providing the CSI as an input to the matrix equalizer computational device when the matrix equalizer computational device is not needed for matrix equalization. Also, the method includes selecting one or more transmit beamsteering codewords from a transmit beamsteering codebook based on output generated by the matrix equalizer computational device in response to the CSI input to the matrix equalizer computational device. The method further includes modulating the second information signal to produce a modulated signal, and providing the modulated signal to the plurality of transmission antennas for transmission to the one or more receivers. Additionally, the method includes controlling the transmission of the modulated signal via the transmission antennas using the selected beamsteering codewords.

In still another embodiment, a wireless transceiver for transmitting an information signal to a plurality of receiver antennas associated with one or more receivers comprises a matrix equalizer, and a multiplexer coupled to an input of the matrix equalizer, the multiplexer to select between the information signal and channel state information (CSI). The apparatus also comprises codeword selection logic coupled to the matrix equalizer, the codeword selection logic to generate an indication of one or more selected beamsteering codewords from a codebook, and a steering matrix calculation unit that determines the steering matrix using the selected beamsteering codewords. Additionally, the apparatus comprises a signal modulator coupled to the matrix equalizer and adapted to modulate the information signal to produce a modulated signal. Further, the apparatus comprises a multiplicity of transmission antennas, and a beamforming network coupled between the signal modulator and the multiplicity of transmission antennas. The apparatus further comprises a controller coupled to the beamforming network to control the beamforming network using the steering matrix so as to produce a transmit gain pattern having one or more high gain lobes when the modulated signal is transmitted via the multiplicity of transmission antennas.

DETAILED DESCRIPTION

While the beamforming techniques described herein for processing and effecting a wireless data transmission are described as being used in communication systems that use one of the IEEE Standard 802.11x communication standards, these techniques may be used in various other types of wireless communication systems and are not limited to those conforming to one or more of the IEEE Standard 802.11x standards.

Figure 1:
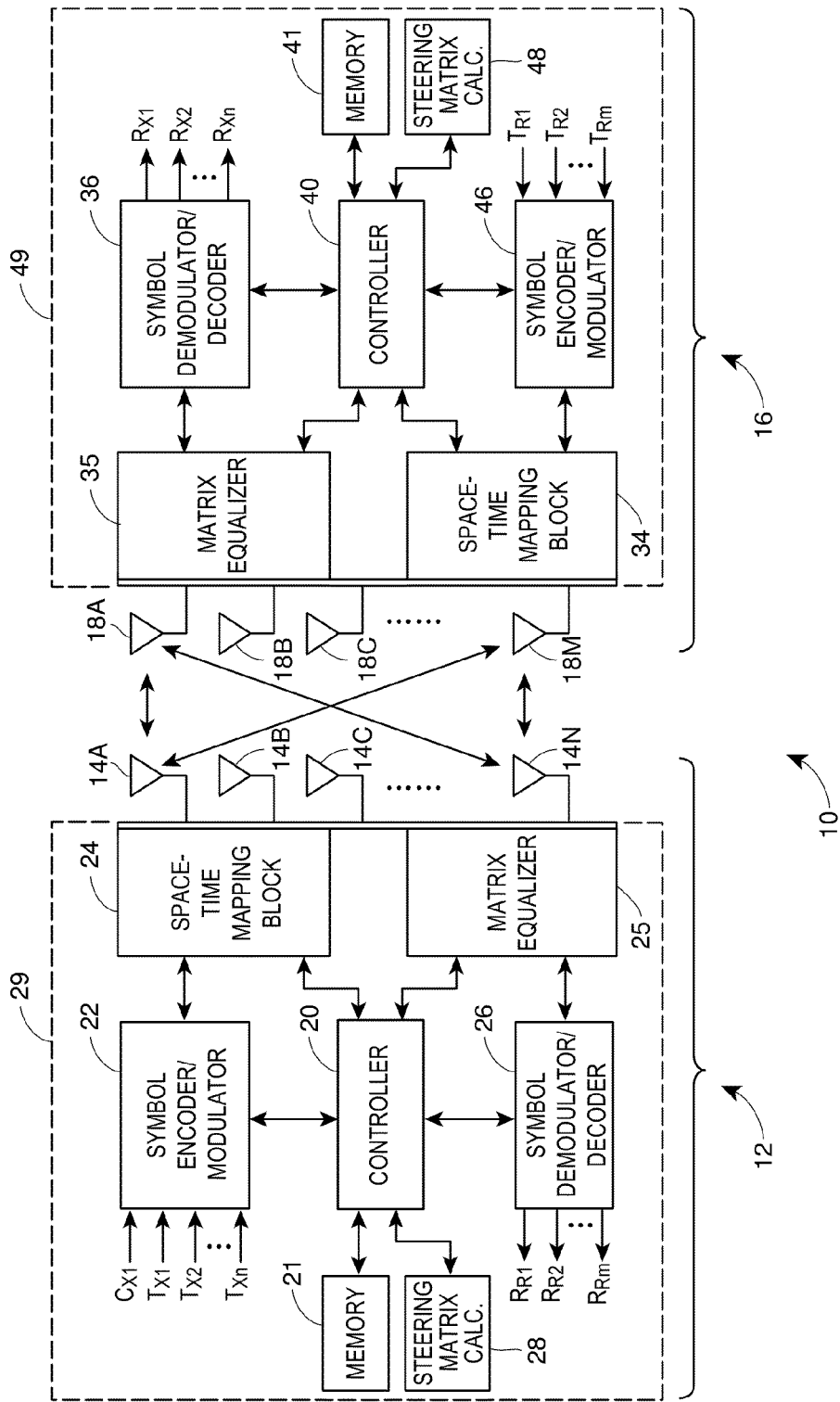
FIG. 1 is a block diagram of a wireless MIMO communication or transmission system that implements a transmitter beamforming technique using matrix equalizer information of a receiver.

Referring now to FIG. 1, a MIMO communication system 10 is illustrated in block diagram form as generally including a single transmitter 12 having multiple transmission antennas 14A-14N and a single receiver 16 having multiple receiver antennas 18A-18M. The number of transmission antennas 14A-14N can be the same as, more than, or less than the number of receiver antennas 18A-18M. As shown in FIG. 1, the transmitter 12 may include a controller 20 coupled to a memory 21, a symbol encoder and modulator unit 22 and a space-time filtering or mapping block 24, also referred to herein as a transmit beamforming network. The transmitter 12 may also include a matrix equalizer 25 and a symbol demodulator and decoder unit 26 to perform demodulation and decoding of signals received via the antennas 14A-14N in a receive mode. Additionally, the transmitter 12 includes a steering matrix calculation unit 28. The controller 12 may be any desired type of controller and both the controller 12 and the steering matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the space-time mapping block 24 or beamforming network, and the matrix equalizer 25 may be implemented using known or standard hardware and/or software elements. If desired, various of the transmitter components, such as the controller 20, the modulator unit 22, the demodulator unit 26, the steering matrix calculation unit 28, the space-time mapping block 24 and the matrix equalizer 25 may be implemented in the same or in different hardware devices, such as in the same or different processors. Additionally, each of these components of the transmitter 12 may be disposed in a housing 29 (shown in dotted relief in FIG. 1). Still further, the routines or instructions for implementing the functionality of any of these components may be stored in the memory 21 or within other memory devices associated with the individual hardware used to implement these components.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. The same control signal or a different control signal may be used to determine the CSI for each frequency and/or spatial channel used in the MIMO communication system 10. The control signal $C_{x1}$ may be referred to as a sounding packet.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more streams of symbols to be modulated and sent from the transmitter 12 to the receiver 16. While the symbols may be modulated using any desired or suitable QAM technique, such as using 64 QAM, these symbols may be modulated in any other known or desired manner including, for example, using any other desired phase and/or frequency modulation techniques. In any event, the modulated symbol streams are provided by the symbol encoder and modulator unit 22 to the space-time mapping block 24 for processing before being transmitted via the antennas 14A-14N. While not specifically shown in FIG. 1, the modulated symbol streams may be up-converted to the RF carrier frequencies associated with an OFDM technique (in one or more stages) before being processed by the space-time mapping block 24 in accordance with a beamforming technique more specifically described herein. Upon receiving the modulated signals, the space-time mapping block 24 or beamforming network processes the modulated signals by injecting delays and/or gains into the modulated signals based on a steering matrix provided by the controller 20, to thereby perform beamsteering or beamforming via the transmission antennas 14A-14N.

The signals transmitted by the transmitter 12 are detected by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$ (i.e., sounding packet). In any event, a symbol demodulator and decoder unit 36, under control of a controller 40, may decode and demodulate the received symbol strings as processed by the matrix equalizer 35. In this process, these signals may be downconverted to baseband. Generally, the matrix equalizer 35 and the demodulator and decoder unit 36 may operate to remove effects of the channel based on the CSI as well as to perform demodulation on the received symbols to produce a digital bit stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ which may be encoded and modulated using any desired encoding and modulation techniques. The encoded and modulated symbol stream may then be upconverted and processed by a space-time mapping block 34 to perform beamsteering based on a steering matrix developed by a steering matrix calculation unit 48, prior to being transmitted via the receiver antennas 18A-18N to, for example, the transmitter 12, thereby implementing the reverse link. As shown in FIG. 1, each of the receiver components may be disposed in a housing 49.

The matrix equalizer 25 and the demodulator/decoder unit 26 within the transmitter 12 operate similarly to the matrix equalizer 35 and the demodulator/decoder unit 36 of the receiver 16 to demodulate and decode the signals transmitted by the receiver 16 to produce the recovered signals $R_{R1}$-$R_{Rm}$. Here again, the matrix equalizer 25 may process the received signals in any known manner to enhance the separation and therefore the reception of the various signals transmitted by the antennas 18A-18M. Of course, the CSI for the various OFDM channel(s) may be used by the steering matrix calculation units 28 and 48 as well as by the controllers 20 and 40 to perform beamforming and to determine a steering matrix used by the space-time mapping blocks 24, 34. As noted above, the CSI, beamforming and other programs and data such as the steering matrix used by the units 28 and 48 and by the controllers 20 and 40 may be stored in the memories 21 and 41.

As is generally known, beamforming or beamsteering typically includes applying appropriate phases and gains to the various signals as sent through the multiple transmitter antennas 14A-14N, in a manner with causes the signals sent from the different transmitter antennas 14A-14N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the MIMO system 10 of FIG. 1, beamforming may be used to enhance signal directivity towards the receiver antennas 18A-18M, which improves the SNR of the transmissions and results in more reliable transmissions. In this case, the beamforming technique will generally form high gain lobes in the direction of propagation at which the highest gain is desired, and in particular in the directions of propagation from the transmitter 12 to each of the receiver antennas 18A-18M of the receiver 16.

To implement beamforming in the transmitter 12, the steering matrix calculation unit 28 may determine or calculate a set of matrix coefficients (referred to herein as a steering matrix) which are used by the space-time mapping block or beamforming network 24 to condition the signals being transmitted by the antennas 14A-14N. If desired, the steering matrix for any particular frequency channel of the MIMO system 10 may be determined by the steering matrix calculation unit 28 based on the CSI determined for that channel (wherein the CSI is usually developed by and sent from the receiver 16 but may instead be developed from signals sent from the receiver 16 to the transmitter 12 in the reverse link as an estimate of the forward link).

Development of the steering matrix can be computationally expensive, and may require feedback (in the form of the CSI) from the receiver 16 to the transmitter 12, especially when there are numerous transmitter antennas and receiver antennas. When performing beamforming, it is optimal to develop the steering matrix using various known computational techniques based on the existence of all of the receiver and transmitter antennas. Such a steering matrix generally creates a transmit beam pattern having a high gain lobe directed to some combination of the receiver antennas as determined from, for example, the CSI. However, as the size of the number of receiver and transmitter antennas increases, the required feedback and number of calculations that need to be performed to develop the optimal steering matrix increases significantly (e.g., exponentially).

To increase efficiency and to reduce the computational load associated with determining the steering matrix, the system of FIG. 1 may develop a steering matrix using information and/or hardware or software used in either the receiver 16 or the transmitter 12 as part of the matrix equalizer functionality which ultimately reduces the computational load associated with beamsteering. For example, the transmitter 12 (or the receiver 16) may develop the steering matrix by using the computational structure of the matrix equalizer to perform steering matrix calculation or selection operations independent of the matrix equalizer computations.

Here, it is useful to note that the matrix equalizer (of the receiver 16 for example) acts on the estimate of the channel CSI to determine matrix coefficients that help equalize (separate) the (multiple) transmitted signals. A matrix equalizer is an essential component of any MIMO communication system, and is needed for a receiver to recover the transmitted signals. Thus, the computational mechanisms used to perform matrix equalization are needed within the receiver hardware components of a MIMO communication system. However, beamforming is an optional technique, and thus any structure added to perform beamforming adds to the cost and computational load of the hardware/software components of the MIMO communication system. However, because both matrix equalization and beamforming are essentially matrix operations, some of the computing structure provided to implement matrix equalization may be used to implement or perform beamforming or beamsteering operations, thereby enabling both of these operations to be performed using common hardware/software or other computational mechanisms. For example, the matrix equalizer often uses a QR decomposition algorithm to determine the equalizer coefficients, and this QR decomposition algorithm may be reused to perform beamforming computations.

Thus, based on the discussion provided above, it is possible to use the computational structure of a matrix equalizer within a MIMO communication system to perform at least some aspects of the transmit beamforming or beamsteering operations. In this case, the transmit beamforming operations using matrix equalizer structure can be performed in either a receiver or a transmitter of the transmitter/receiver pair in which transmit beamforming is to be used in sending signals from the transmitter to the receiver of the transmitter/receiver pair. In one case, the steering matrix calculation unit 28 or 48 may use some of the computational structure of the associated matrix equalizer 25 or 35 to compute a beamforming matrix and/or to select beamforming vectors from a codebook. In the case in which the matrix equalizer 35 of the receiver 16 is used to perform calculations for transmit beamforming within the transmitter 12, the processing using the matrix equalizer 35 is performed in the receiver 16 to develop the beamforming measure or to develop the steering matrix itself, and the beamforming measure or the steering matrix itself may be sent to the transmitter 12. On the other hand, if the matrix equalizer 25 of the transmitter 12 is used to perform beamforming calculations for transmit beamforming within the transmitter 12, the beamforming calculations may of course be made on information regarding the reverse link collected at the transmitter 12, or on information sent to the transmitter 12 (such as CSI) from the receiver 16. In this case, the matrix equalizer 25 may be used to develop a beamforming measure and the steering matrix calculation unit 28 may then develop the steering matrix from the beamforming measure. Of course, in this case, it will be understood that the beamforming computations made using the structure or algorithms of the matrix equalizer 25 may produce coefficients or other information not related in any way to the coefficients required for equalization of a transmitted signal.

In any event, as discussed above, the matrix equalizer 35 (of the receiver 16) or the matrix equalizer 25 (of the transmitter 12) may be used to perform beamforming calculations for the performing transmit beamforming between the transmitter 12 and the receiver 16. If the matrix equalizer 35 of the receiver 16 is used to perform these beamforming calculations, the steering matrix calculation unit 48 may, for example, use the structure of the matrix equalizer 35 to develop appropriate intermediate information needed for determining the transmit steering matrix such as QR decomposition information, codebook selection information, etc. The steering matrix calculation unit 48 may then send this intermediate information to the transmitter 12 for use by the steering matrix calculation unit 28 in forming the transmit steering matrix. On the other hand, if desired, the steering matrix calculation unit 48 may actually form the transmit steering matrix from the intermediate information developed using the matrix equalizer 35 and send this steering matrix to the transmitter 12. Alternatively, if the matrix equalizer 25 of the transmitter 12 is used to perform beamforming calculations, the steering matrix calculation unit 28 of the transmitter 12 may use the structure or algorithms of the matrix equalizer 25 to develop the intermediate information such as QR decomposition information, codebook selection information, etc., and then develop the transmit steering matrix from this information. The steering matrix calculation units 28 and 48 may, of course reuse as much of the components and structure of the matrix equalizers 25 and/or 35 as possible or desired in computing the transmit steering matrix for use by the transmitter 12.

Using information pertaining to a matrix equalizer in a receiver to determine the steering matrix used by a transmitter to perform beamforming in the transmission of a signal to the receiver may reduce the circuitry and/or software for forming the steering matrix, may reduce the complexity of the hardware and/or the software used to implement the transmitter 12 and may also increase the speed at which the transmitter 12 is able to transmit information or adapt to new channel conditions based on the receipt of new or updated CSI.

Figure 2:
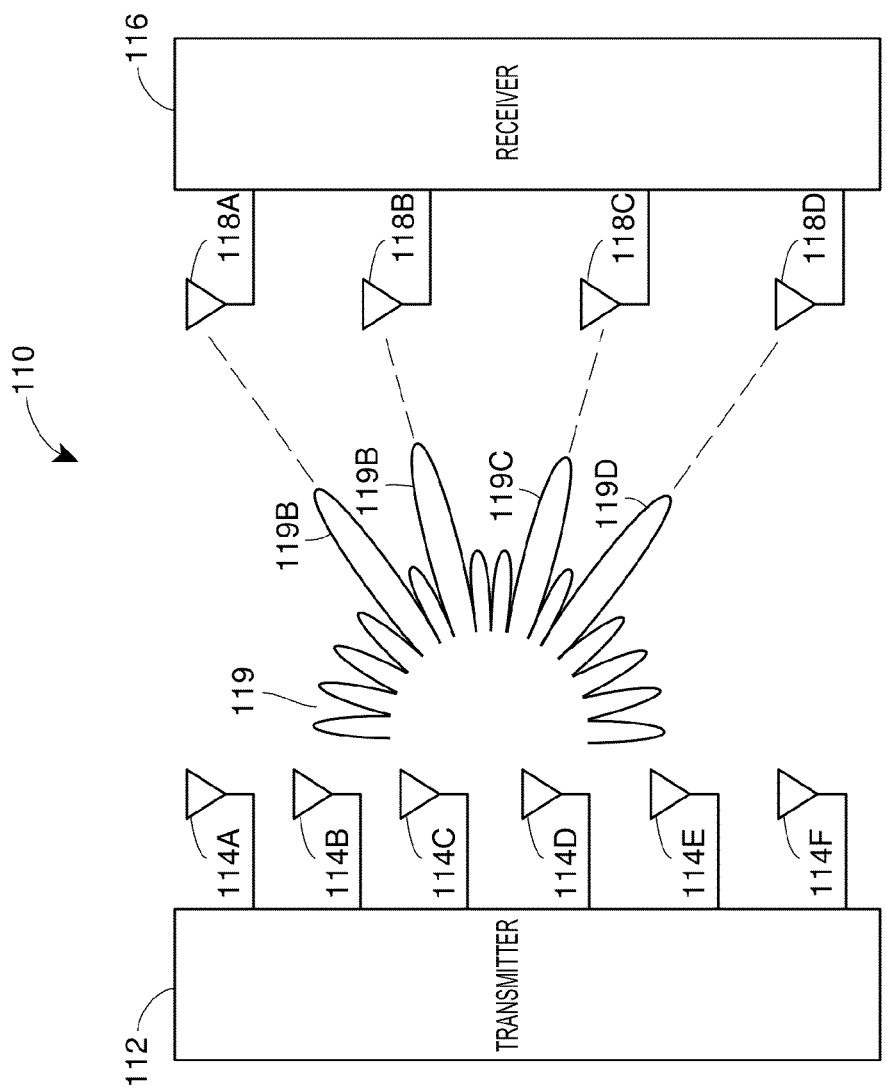
FIG. 2 is a block diagram illustrating a transmit gain pattern for wireless communications between a single transmitter and a single receiver using a transmitter beamforming technique that incorporates the use of receiver matrix equalizer information.

To illustrate the beamforming technique described herein, FIG. 2 shows a MIMO communication system 110 having a single transmitter 112 with six transmission antennas 114A-114F, and a single receiver 116 with four receiver antennas 118A-118D. In this example, the steering matrix is developed by the transmitter 112 using feedback indicative of the CSI and/or intermediate steering matrix information to create a transmit gain pattern 119 as shown disposed next to the transmitter 112. As illustrated in FIG. 2, the transmit gain pattern 119 includes multiple high gain lobes 119A-119D disposed in the directions of the receiver antennas 118A-118D. The high gain lobes 119A-119D are orientated in the directions of propagation from the transmitter 112 to the particular receiver antennas 118A-118D while lower gain regions, which may even include one or more nulls, are produced in other directions of propagation. While FIG. 2 illustrates a separate high gain lobe directed to each of the receiver antennas 118A-118D, it will be understood that the actual gain pattern produced by the beam steering matrix calculations using information pertaining to the matrix equalizer of the receiver 116 may not necessarily include a separate high gain lobe for each of the receiver antennas 118A-118D. Instead, the gain pattern developed by the beam steering matrix for the transmitter 112 may have a single high gain lobe covering or directed generally to more than one of the receiver antennas 118A-118D. Thus, it is to be understood that the beam pattern resulting from the creation of a steering matrix using information pertaining to the matrix equalizer of the receiver may or may not have separate high gain lobes separated by low gain regions or nulls for each of the receiver antennas.

Of course, developing the beam pattern 119 to have high gain regions and low gain regions based on information generated by the matrix equalizer of the receiver 116 may be performed in any desired manner and location. For example, any of the components within the receiver 16 of FIG. 1, including the controller 40 and the steering matrix calculation unit 48 optionally may process the steering information generated by the matrix equalizer 35 and may then send this information to the transmitter 12. In this case, the controller 20 or the steering matrix calculation unit 28 within the transmitter 12 may use the information generated by the matrix equalizer 35, and optionally processed by other components of the receiver 116, to determine the steering matrix for use in the space-time mapping block 24 for performing beamforming to the receiver 16. On the other hand, the controller 40 or the steering matrix calculation unit 48 within the receiver 16 may use the steering information generated by the matrix equalizer 35 within the receiver 16 to determine the steering matrix for use in the space-time mapping block 24 of the transmitter 12, and may then transmit this steering matrix to the transmitter 12.

The receiver 116 may compute the steering matrix to be used by the transmitter 112 based on the steering information generated by the matrix equalizer 35 and, if desired, the CSI developed by the receiver 116, and may send the actual steering matrix to the transmitter 112 to be used in transmitting information to the receiver 16. On the other hand, the steering matrix for the transmitter space-time mapping block 24 of FIG. 1 may be calculated by the steering matrix calculation unit 28 within the transmitter 12 based on the steering information generated by the matrix equalizer 35 of the receiver 16 and possibly the CSI provided and sent back from the receiver 16 to the transmitter 12.

Figure 3:
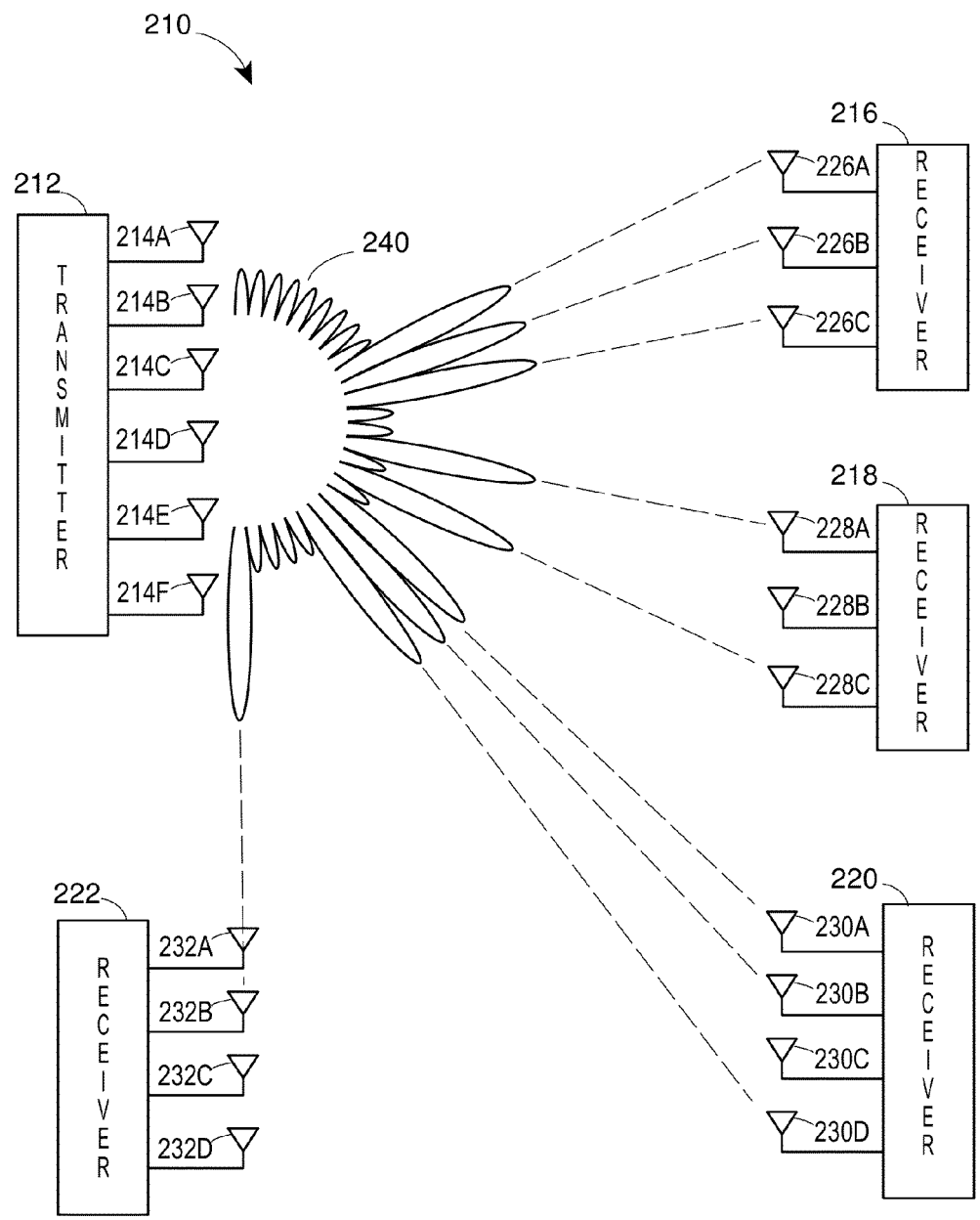
FIG. 3 is a block diagram illustrating a transmit gain pattern for wireless communications between a single transmitter and multiple receivers, wherein the transmitter performs beamforming using information pertaining to one or more of the matrix equalizers of the transmitter or one or more of the multiple receivers.

Of course, the beamforming technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith. For example, FIG. 3 illustrates a MIMO system 210 in which a single transmitter 212 having multiple (in this example six) transmission antennas 214A-214F transmits to multiple receivers 216, 218, 220 and 222, each having multiple receiver antennas 226A-226C, 228A-228C, 230A-230D, and 232A-232D, respectively. While shown in this example as including three or four receiver antenna, any or all of the receivers 216, 218, 220, 222 of FIG. 3 could include different numbers of receiver antennas, including only a single receiver antenna if so desired. In any event, as illustrated by the transmit gain pattern 240 illustrated in FIG. 3, the steering matrix calculated and used by the transmitter 212 is formed using steering information generated by one or more matrix equalizer blocks in one or more of the transmitter 212 and/or the receivers 216, 218, 220 and 222.

In one example, the transmitter steering matrix may be calculated or determined using steering information generated by matrix equalizer blocks in each of the receivers 216, 218, 220 and 222, so that, as shown by the transmit gain pattern 240, a high gain lobe is directed to at least one receiver antenna of each of the receivers 216, 218, 220, 222 at the same time. However, the steering matrix need not necessarily produce a high gain lobe directed to all of the receiver antennas of each of the receivers 216, 218, 220, 222, and not necessarily to all of the receiver antennas for any particular one of the receivers 216, 218, 220, 222. Thus, as illustrated in FIG. 3, the steering matrix for the transmitter 212 is determined in such a manner that a separate high gain lobe is directed to each of the receiver antennas 226A, 226B, 226C, 228A, 228C, 230A, 230B and 230D. However, due to the physical location of the receiver 222 and its antennas with respect to the transmitter 212, a single high gain lobe is directed to the receiver antennas 232A-232D, resulting in a single high gain lobe in the transmit gain pattern 240 directed to all of these receiver antennas On the other hand, the transmitter 212 may develop a different steering matrix for each of the receivers 216, 218, 220 and 222 using steering information generated by the different matrix equalizer blocks of each of these receivers, and may use those steering matrixes to beamform to the separate or different receivers at different times or using different channels, e.g., OFDM channels, of the system.

While, in many cases, it will be desirable to beamform in such a way to direct a high gain lobe to at least one receiver antenna from each receiver, it may not be necessary to implement this requirement in all cases. For example, a particular receiver may be in a direct line of sight from the transmitter to another receiver and therefore may be disposed in a high gain region of the transmitter and may thus adequately receive the transmitted signals from the transmitter without utilizing steering information generated by the matrix equalizer block of that receiver. As another example, a particular receiver may be disposed in a low gain region associated with the transmitter, but may be disposed relatively close to the transmitter so that the particular receiver adequately receives the signals transmitted by the transmitter without utilizing steering information generated by the matrix equalizer block of that receiver. Of course, if desired, the number and location (identity) of the receivers used in calculating the transmitter steering matrix can be determined in any manner, including by trial and error, in determining an acceptable or optimal steering matrix using steering information generated by matrix equalizers from more than one receiver. Still further, while the maximum gains of the high gain lobes of each of the transmit gain patterns shown in FIGS. 2 and 3 are shown as being the same, the steering matrix calculation units 28 and 48 may develop steering matrixes which produce high gain lobes with differing maximum gains.

In some embodiments, a steering matrix may be generated from entries in a codebook. For example, if the codebook is a matrix, the steering matrix may be generated by selecting a subset of one or more columns in the codebook matrix. As will be described in more detail below, selection of columns in a codebook matrix may be implemented, at least partially, by using computational resources of the matrix equalizer 25 of the transmitter 16 or the matrix equalizer 35 of the receiver 14 (FIG. 1).

Figure 4:
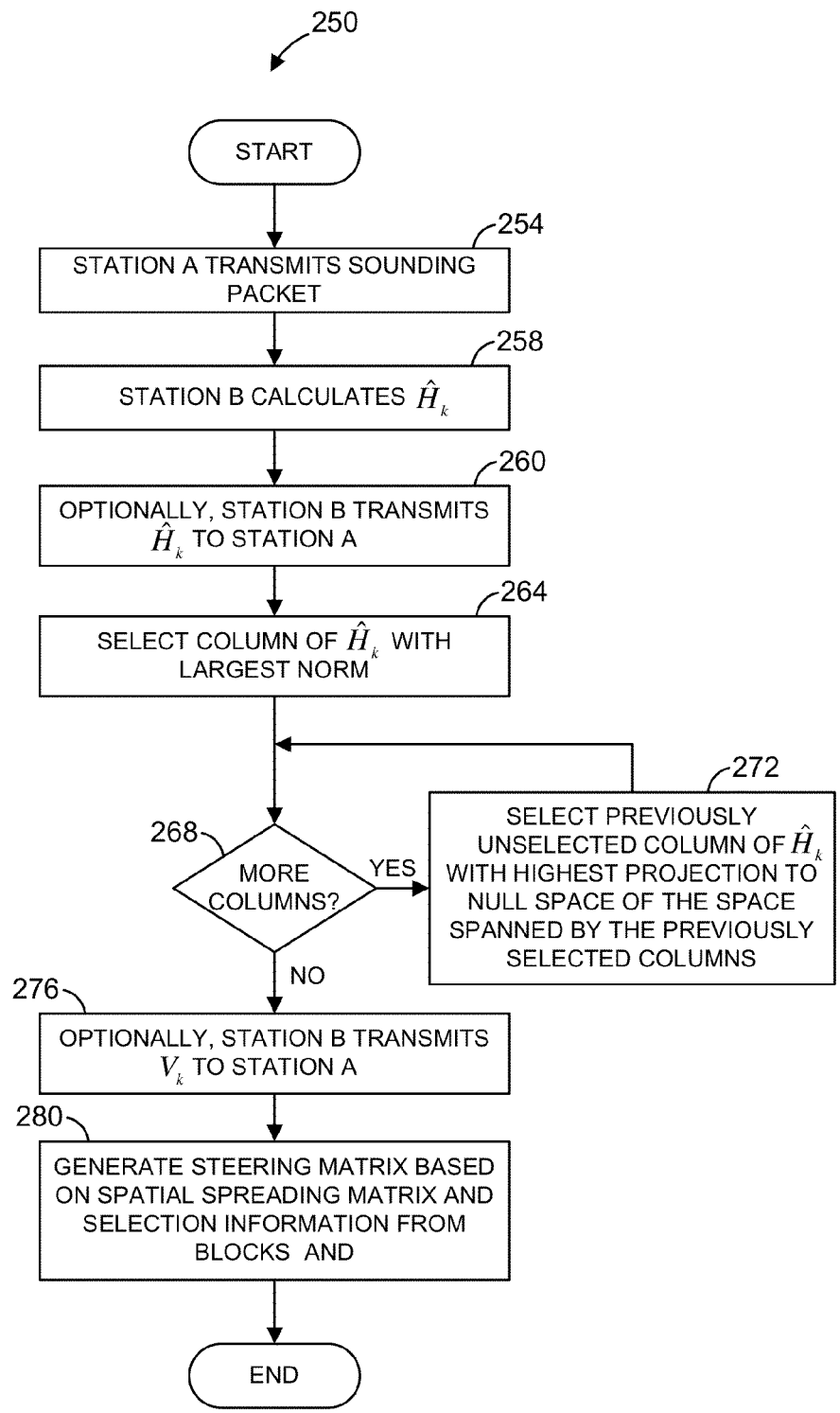
FIG. 4 is a flow diagram of an example codebook selection method that may be partially implemented by using computational resources of a matrix equalizer.

Referring now to FIG. 4, one example codebook selection method 250 will now be described, and the example codebook selection method 250 may be partially implemented by using computational resources of the matrix equalizer 25 of the transmitter 16 or the matrix equalizer 35 of the receiver 14 (FIG. 1), as will be described in more detail subsequently. The method 250 will be described with reference to two stations: Station A and Station B. Station A may be a device such as the transmitter 16 of FIG. 1, and Station B may be a device such as the receiver 14 of FIG. 1.

At a block 254, Station A transmits a sounding packet (e.g., a packet that includes full MIMO training information) to Station B. The sounding packet is transmitted using a spatial spreading matrix $Q_{k,sounding}$, where k is an index indicating a sub-carrier of an OFDM modulation scheme. In other words, the spatial spreading matrix $Q_{k,sounding}$, corresponds to the spatial spreading matrix for the $k^{th}$ sub-carrier. $Q_{k,sounding}$ is an $N_{TX} \times N_{TX}$ matrix, where $N_{TX}$ is the number of antennas of Station A. At a block 258, Station B calculates estimates $\hat{H}_k$ of the channel on receiving the sounding packet. In other words, $\hat{H}_k$ is an estimate of $H_k Q_{k,sounding}$ where $H_k$ is the equivalent, actual channel for the $k^{th}$ sub-carrier. $H_k$ is an $N_{TX} \times N_{TX}$ matrix. At a block 260, Station B may optionally transmit $\hat{H}_k$ to Station A. $\hat{H}_k$ may be CSI.

At a block 264, the column of $\hat{H}_k$ with the largest norm may be determined and selected. Selecting the column may include generating a first column of a codebook selection matrix $V_k$, which is an $N_{TX} \times N_{SS}$ matrix having $N_{SS}$ columns of the $N_{TX} \times N_{TX}$ identity matrix. $N_{SS}$ is the number of signal streams transmitted by Station A, where $N_{SS} < N_{TX}$. If the $i^{th}$ column of $\hat{H}_k$ is selected at the block 264, the 1st column of $V_k$ may be generated by setting the $i^{th}$ row in the first column to one, and setting the other elements of the first column to zero.

At a block 268, it may be determined if there are more columns of $\hat{H}_k$ that need to be selected or if there are more columns of $V_k$ that need to be generated. If more columns need to be selected/generated, the flow may proceed to a block 272. At the block 272, the previously unselected column of $\hat{H}_k$ with the highest projection to the null space of the space spanned by the previously selected columns of $\hat{H}_k$ may be determined, and this column may be selected. In other words, the previously unselected column of $\hat{H}_k$ with the highest orthogonality to the space spanned by the previously selected columns of $\hat{H}_k$ may be determined. Similar to the block 264, selecting the column may include generating a next column of a steering matrix $V_k$. If the $i^{th}$ column of $\hat{H}_k$ is selected at the block 272 for the $j^{th}$ column of $V_k$, the $j^{th}$ column of $V_k$ may be generated by setting the $i^{th}$ row in the $j^{th}$ column to one, and setting the other elements of the $j^{th}$ column to zero. Then, the flow may proceed back to the block 268.

The blocks 264, 268 and 272 may be implemented at Station B. But if Station B transmits $\hat{H}_k$ to Station A (block 260), the blocks 264, 268 and 272 may be implemented at Station A.

If at the block 268 it is determined that there are no more columns to be selected/generated, the flow may proceed to block 276 (or block 280 if block 276 is omitted). If the blocks 264, 268 and 272 are implemented at Station B, Station B may transmit indications of the selected columns to Station A. For example, Station B may transmit the matrix $V_k$ to Station A. The blocks 264, 268 and 272 may be implemented or partially implemented in the steering matrix calculation unit 28 and/or the steering matrix calculation unit 48 (FIG. 1). Additionally, the blocks 264, 268 and 272 may be implemented or partially implemented in the matrix equalizer unit 25 and/or the matrix equalizer unit 35 (FIG. 1).

At a block 280, a steering matrix $Q_{steer,k}$ may be generated based on $Q_{k,sounding}$ and indications of the selected columns of $\hat{H}_k$ (e.g., the matrix $V_k$). The steering matrix $Q_{steer,k}$ is an $N_{TX} \times N_{SS}$ steering matrix for the $k^{th}$ sub-carrier. For example, the steering matrix $Q_{steer,k}$ may be generated as $Q_{k,sounding} V_k$. The block 280 may be implemented in the steering matrix calculation unit 28 and/or the steering matrix calculation unit 48 (FIG. 1).

Figure 5A:
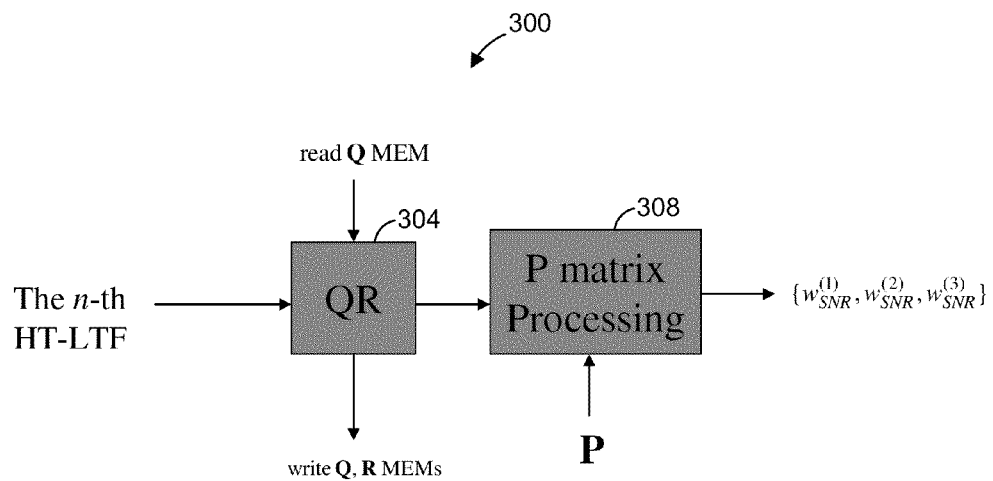
FIG. 5A is a block diagram of an example matrix equalizer computational block.

Referring now to FIG. 5A, an example matrix equalizer computational block 300 will now be described. The block 300 may be included in the matrix equalizer 25 and/or the matrix equalizer 35 of FIG. 1, for example. As will be described subsequently, the block 300 may be reused for calculations related to beamsteering.

In FIG. 5A, the block 300 is illustrated in the context of processing a high throughput, long training field (HT-LTF). In systems compliant with the IEEE 802.11n Standard, HT-LTFs are periodically generated and transmitted by a transmitter. Each HT-LTF includes a plurality of training symbols. At the transmitter, each training symbol is multiplied by a corresponding column of a preamble steering matrix P, wherein a number of rows of the matrix P corresponds to the number of transmit antennas, and a number off columns of the matrix P corresponds to the number of HT-LTFs. Matrix P is configured to improve the orthogonality of the training symbols as they are transmitted from the antennas of the transmitter.

A receiver knows what training symbols were transmitted in the HT-LTFs and also knows the matrix P. After receiving all of the HT-LTFs, the receiver generates a channel estimate matrix H based on the known training symbols, the matrix P, and the received training symbols. The matrix H can then be used to adjust matrix equalizer coefficients. The block 300 can be used by a receiver to process HT-LTFs for updating equalizer coefficients. Also, as will be described with reference to FIG. 6A, the block 300 can be used to apply an equalizer matrix to received data.

Figure 5B:
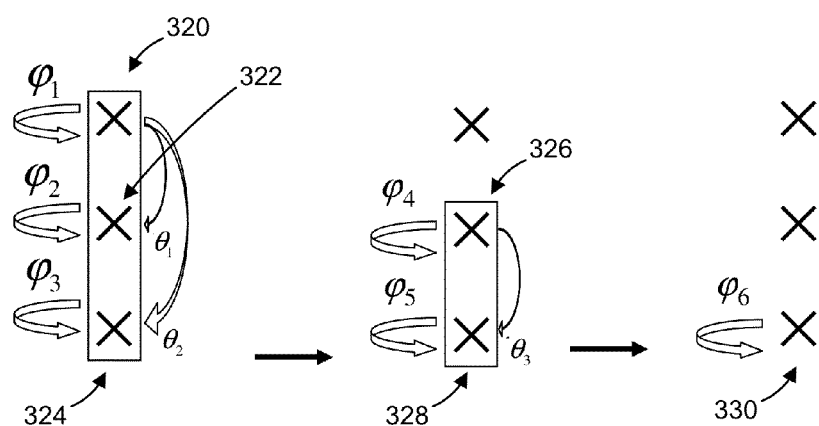
FIG. 5B is an illustration of an iterative algorithm for decomposing a 3×3 matrix into Q and R matrices.

The block 300 includes a QR decomposition processor 304, which is coupled to a Q memory and an R memory (not shown). Generally speaking, QR decomposition is a method in which a matrix is decomposed into a Q matrix multiplied by an R matrix, wherein the Q matrix is an orthogonal matrix (i.e., $Q^T Q = I$) and R is an upper triangular matrix. The QR decomposition processor 304 iteratively decomposes an input matrix. For example, the QR decomposition processor 304 may implement a Householder reflections algorithm, a Givens rotations algorithm, etc., to iteratively decompose an input matrix into Q and R matrices. In one embodiment, the QR decomposition processor 304 implements an algorithm that will be described with reference to FIG. 5B. In particular, FIG. 5B illustrates an iterative algorithm for decomposing a 3×3 matrix into Q and R matrices. One of ordinary skill in the art will recognize that the algorithm to be described with reference to FIG. 5B can be straightforwardly modified for use with decomposing other size matrices.

In FIG. 5B, the matrix to be decomposed is represented by a 3×3 array of X's. First, a matrix $Q_1$ is determined such that multiplying it by the original matrix will cause the complex element 320 to become a real number. This process may be considered as rotating the complex element 320 by an angle $\phi_1$. The matrix $Q_1$ may be stored in a Q memory, and the resultant matrix ($R_1$), i.e., the original matrix after element 320 has been rotated by $\phi_1$, may be stored in an R memory. Optionally, the angle $\phi_1$ may be stored in the Q memory, rather than the matrix $Q_1$. Optionally, the $R_1$ matrix may be kept in a temporary storage, rather than being stored in the R memory. Similarly, a matrix $Q_2$ is determined such that $Q_2 R_1$ will cause the complex element 322 to become a real number. This process may be considered as rotating the complex element 322 by an angle $\phi_2$. The multiplication result $Q_2 Q_1$ and may be stored in the Q memory such that $Q_1$ is overwritten, and the resultant matrix ($R_2$) is stored in the R memory such that $R_1$ is overwritten. Optionally, the angle $\phi_2$ may be stored in the Q memory, rather than the matrix $Q_2 Q_1$. Optionally, the $R_2$ matrix may overwrite the $R_1$ matrix in temporary storage. Then, a matrix $Q_3$ is determined such that $Q_3 R_2$ will cause the complex element 324 to become a real number. This process may be considered as rotating the complex element 324 by an angle $\phi_3$. The multiplication result $Q_3Q_2Q_1$ may be stored in the Q memory such that $Q_2Q_1$ is overwritten, and the resultant matrix ($R_3$) is stored in the R memory such that $R_2$ is overwritten. Optionally, the angle $\phi_3$ may be stored in the Q memory, rather than the matrix $Q_3Q_2Q_1$. Optionally, the $R_3$ matrix may overwrite the $R_2$ matrix in temporary storage.

Next, a matrix $Q_4$ is determined such that $Q_4R_3$ the vector including elements 320 and 322 is rotated by an angle $\theta_1$ that causes the element 322 to go to zero. The multiplication result $Q_4Q_3Q_2Q_1$ may be stored in the Q memory such that $Q_3Q_2Q_1$ is overwritten, and the resultant matrix ($R_4$) is stored in the R memory such that $R_3$ is overwritten. Optionally, the angle $\theta_1$ may be stored in the Q memory, rather than the matrix $Q_4Q_3Q_2Q_1$. Optionally, the $R_4$ matrix may overwrite the $R_3$ matrix in temporary storage. Similarly, a matrix $Q_5$ is determined such that $Q_5R_4$ the vector including elements 320 and 324 is rotated by an angle $\theta_2$ that causes the element 324 to go to zero. The multiplication result $Q_5Q_4Q_3Q_2Q_1$ may be stored in the Q memory such that $Q_4Q_3Q_2Q_1$ is overwritten, and the resultant matrix ($R_5$) is stored in the R memory such that $R_3$ is overwritten. Optionally, the angle $\theta_2$ may be stored in the Q memory, rather than the matrix $Q_5Q_4Q_3Q_2Q_1$. Optionally, the $R_5$ matrix may overwrite the $R_4$ matrix in temporary storage.

In subsequent iterations, element 326 is rotated by an angle $\phi_4$ and element 328 is rotated by angle $\phi_5$. Then, the vector including elements 326 and 328 is rotated by an angle $\theta_3$ that causes the element 328 to go to zero. Finally, the element 330 rotated by an angle $\phi_6$. After rotating element 330 by the angle $\phi_6$, the Q memory may be updated and thus contains the Q matrix corresponding to the QR decomposition and/or the angles $\phi_1$-$\phi_6$ and $\theta_1$-$\theta_3$. Also, the resultant matrix may be stored in the R memory and the R memory will thus contain the R matrix corresponding to the QR decomposition. Processing the first HT-LTF may omit the rotations $\phi_4$-$\phi_6$ and $\theta_3$.

Referring again to FIG. 5A, the QR decomposition processor 304 may implement the algorithm described with reference to FIG. 5B. The QR decomposition processor 304 may receive a matrix corresponding to each tone corresponding to each HT-LTF received by the receiver. In particular, each matrix may include rows and columns that correspond to a number of training symbols received by a number of receiver antennas.

The QR decomposition processor 304 is coupled to a P matrix processing block 308 that generates a plurality of substream signal-to-noise (SNR) values ($W_{SNR}^{(1)}$, $W_{SNR}^{(2)}$, $W_{SNR}^{(3)}$) based on the R matrix and the P matrix. Each of the substream SNR values may correspond to one of the receiver antennas. The substream SNR values may be utilized for updating the matrix equalizer coefficients.

Figure 6A:
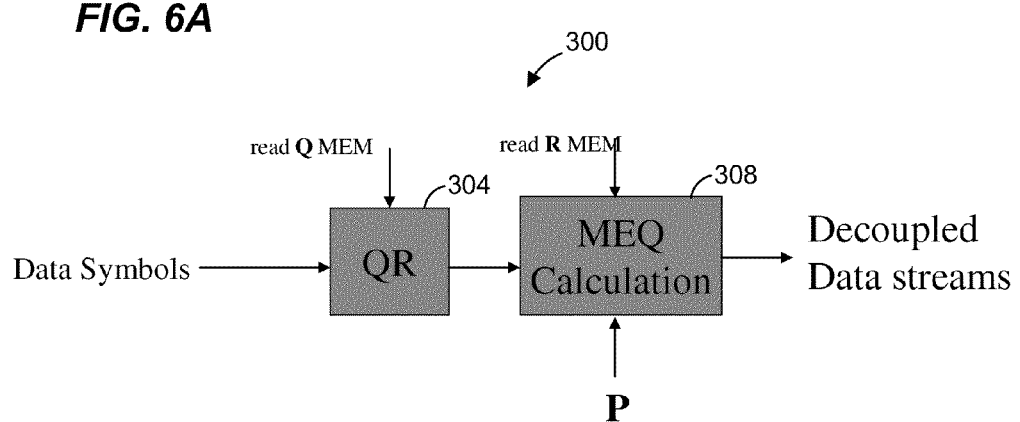
FIG. 6A is a block diagram of the example matrix equalizer computational block of FIG. 5A shown in a different context.
Figure 6B:
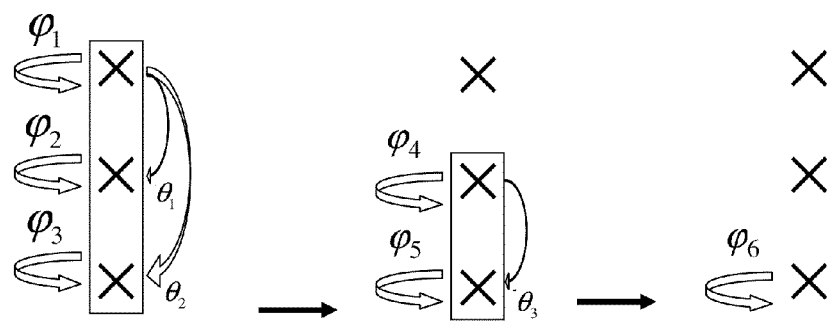
FIG. 6B is an illustration of an iterative algorithm for decomposing a 3×3 matrix into Q and R matrices.

After the HT-LTFs have been processed, the block 300 may also be utilized to apply matrix equalization to data symbols. FIG. 6A is a block diagram showing the block 300 in the context of processing data symbols. In particular, the QR decomposition processor 304 receives and process data symbols. The block 308 applies matrix equalization to the processed data symbols based on the R matrix and the P matrix. FIG. 6B illustrates that, when processing the data symbols, the QR decomposition processor 304 applies rotations similar to those discussed above with respect to FIG. 5B.

Figure 7:
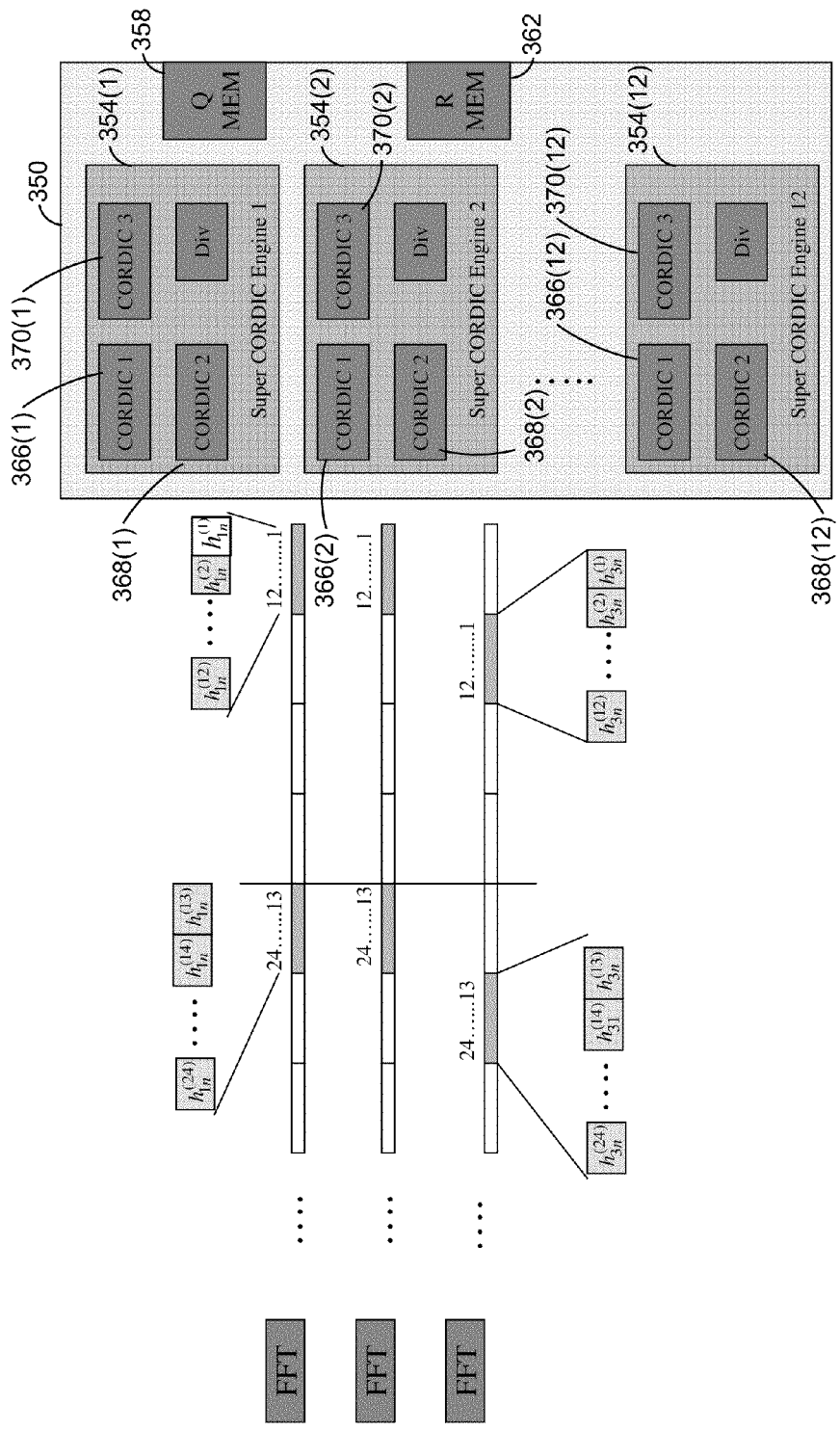
FIG. 7 is a block diagram of an example QR decomposition processor that may be utilized in a matrix equalizer such as the matrix equalizer of FIGS. 5A and 6A.

FIG. 7 is a block diagram illustrating one example QR decomposition processor 350 that may be utilized as the decomposition processor 304 of FIGS. 6A and 6B. The QR decomposition processor 350 includes twelve coordinate rotation digital calculation (CORDIC) engines 354 coupled to a Q memory 358 and an R memory 362. Although twelve CORDIC engines 354 are illustrated in FIG. 7, there may be more or less than twelve physical CORDIC engines 354. For example, in some implementations, a physical CORDIC engine 354 may be time-shared so that it acts as multiple "virtual" CORDIC engines 354. As another example, if operation in a 40 MHz mode is to be supported, there may be thirteen virtual or physical CORDIC engines 354. In the example of FIG. 7, each CORDIC engine 354 includes three CORDIC calculation blocks 366, 368, 370 (i.e., CORDIC calculators). In other implementations, each CORDIC engine 354 may include less than or more than three CORDIC calculation blocks.

In the example of FIG. 7, the QR decomposition processor 350 receives three data streams corresponding to three receive antennas. The data streams may be received from Fast Fourier Transform (FFT) blocks, directly or indirectly. In FIG. 7, received data corresponds to HT-LTFs, where $h_{jn}^{(k)}$ is the $n^{th}$ HT-LTF signal in the $k^{th}$ tone at the $j^{th}$ receive antenna. Thus, in a first time period, the QR decomposition processor 350 receives HT-LTF signals corresponding to twelve tones and two antennas. In a second time period, the QR decomposition processor 350 receives HT-LTF signals corresponding to the twelve tones and the third antenna. Each CORDIC engine 354 operates on HT-LTF data corresponding to a single tone. For example, the CORDIC engine 354(1) may operate on $H_{1n}^{(1)}$, $h_{2n}^{(1)}$, and $h_{3n}^{(1)}$, whereas the CORDIC engine 354(2) may operate on $H_{1n}^{(2)}$, $h_{2n}^{(2)}$, and $h_{3n}^{(2)}$.

Figure 8:
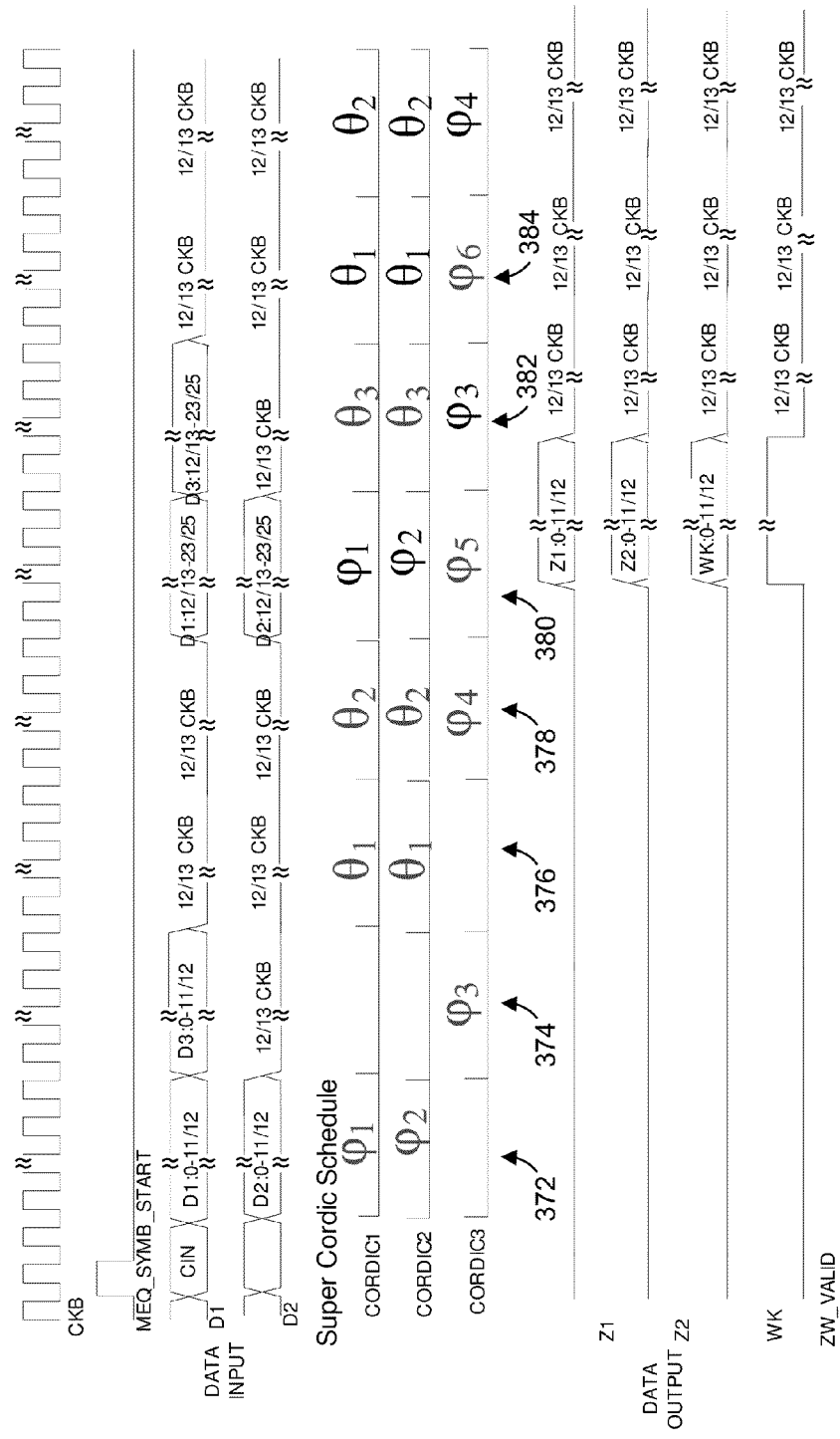
FIG. 8 is a timing diagram illustrating operation of the QR decomposition processor of FIG. 7.

FIG. 8 is a timing diagram corresponding to the QR decomposition processor 350. In a first time period 372, the QR decomposition processor 350 receives HT-LTF signals corresponding to twelve tones received by first and second antennas. During the time period 372, the CORDIC calculation blocks 366 may calculate the rotation angles $\phi_1$ for the first twelve tones based on the received data corresponding to the first antenna. Also, during the time period 372, the CORDIC calculation blocks 368 may calculate the rotation angles $\phi_2$ for the first twelve tones based on the received data corresponding to the second antenna.

During a time period 374, the QR decomposition processor 350 receives HT-LTF signals corresponding to the twelve tones received by the third antenna. During the time period 372, the CORDIC calculation blocks 370 may calculate the rotation angles $\phi_3$ for the first twelve tones based on the received data corresponding to the third antenna.

During a time period 376, the CORDIC calculation blocks 366 and the CORDIC calculation blocks 368 may calculate the rotation angles $\theta_1$ for the first twelve tones. During a time period 378, the CORDIC calculation blocks 366 and the CORDIC calculation blocks 368 may calculate the rotation angles $\theta_2$ for the first twelve tones. Also during the time period 378, the CORDIC calculation blocks 370 may calculate the rotation angles $\phi_4$ for the first twelve tones.

During a time period 380, the QR decomposition processor 350 receives HT-LTF signals corresponding to the next twelve tones received by first and second antennas. During the time period 380, the CORDIC calculation blocks 366 may calculate the rotation angles $\phi_1$ for the next twelve tones. Also, during the time period 380, the CORDIC calculation blocks 368 may calculate the rotation angles $\phi_2$ for the next twelve tones. Further during the time period 380, the CORDIC calculation blocks 370 may calculate the rotation angles $\phi_5$ for the first twelve tones.

During a time period 382, the QR decomposition processor 350 receives HT-LTF signals corresponding to the next twelve tones received by the third antenna. During the time period 382, the CORDIC calculation blocks 366 and the CORDIC calculation blocks 368 may calculate the rotation angles $\theta_3$ for the first twelve tones. Also during the time period 382, the CORDIC calculation blocks 370 may calculate the rotation angles $\phi_3$ for the next twelve tones.

During a time period 384, the CORDIC calculation blocks 366 and the CORDIC calculation blocks 368 may calculate the rotation angles $\theta_1$ for the next twelve tones. Also during the time period 384, the CORDIC calculation blocks 370 may calculate the rotation angles $\phi_6$ for the first twelve tones.

If a 40 MHz mode is to be supported and if the QR decomposition processor 350 includes thirteen physical or virtual CORDIC blocks 354, the scheduling of FIG. 8 may be modified by, for example, providing HT-LTF signals corresponding to thirteen tones during the time periods 372, 374, 380 and 382. Similarly, angle rotations may be calculated for thirteen tones during a time period.

Figure 9:
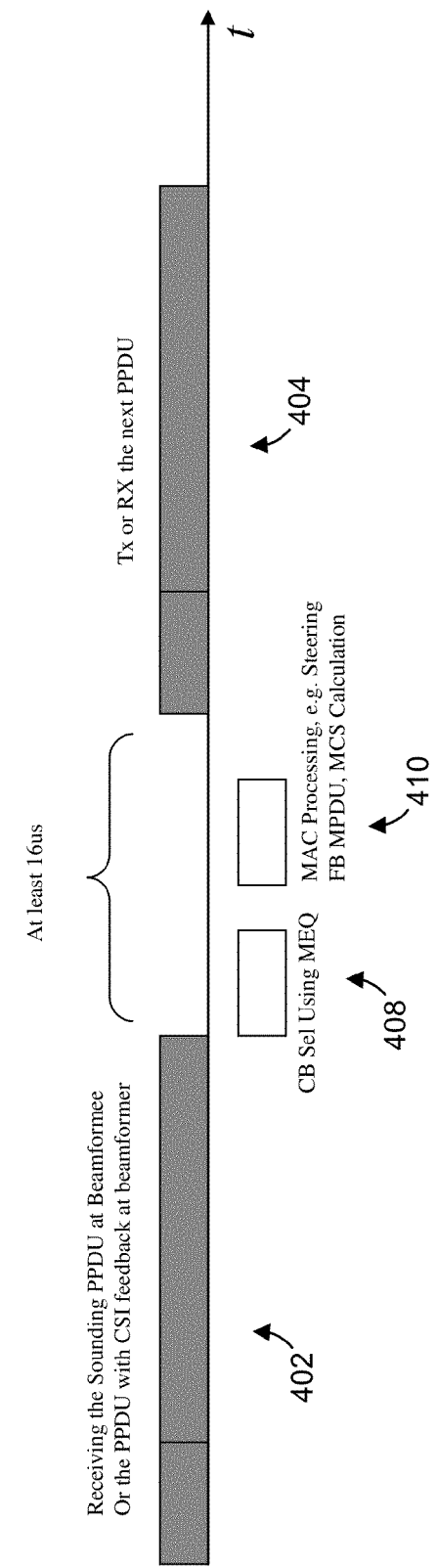
FIG. 9 is a timing diagram illustrating one example schedule for reusing a matrix equalization block for transmit beamsteering calculations.

FIG. 9 is a timing diagram illustrating one example schedule for using a matrix equalization block for transmit beamsteering calculations. The timing diagram illustrates a schedule of processing performed by a beamformee (e.g., receiver 16 of FIG. 1) or a beamformer (e.g., transmitter 12 of FIG. 1). In a first time period 402, a sounding packet may be received and processed by the beamformee. Alternatively, a packet including CSI feedback may be received and processed by the beamformer. At a subsequent time 404, the beamforee/beamformer may process another received packet or a packet to be transmitted. Between the two time periods 402 and 404 there is a gap of at least 16 microseconds, and this minimum time gap is defined by the IEEE 802.11n standard. During this gap, and for approximately 8 microseconds after the gap, a matrix equalizer is typically idle. Therefore, a matrix equalization block may be utilized during this gap for transmit beamforming calculations. For example, during a time period 408, the matrix equalizer block may be utilized to perform steering codebook selection calculations, as will be described in more detail below. Additionally, during a time period 410, the matrix equalizer block may be utilized to perform other calculations, as will be described in more detail below.

As will be described below, a matrix equalizer block may be modified in a relatively minor fashion to implement the transmit beamforming calculations, as compared to including a separate dedicated block to implement the transmit beamforming calculations. Additionally, utilizing the matrix equalizer block to perform transmit beamforming calculations may help achieve relatively high-speed steering calculation so that beamsteering feedback or transmit beamsteering may be implemented soon after determining the CSI information. This may help improve performance because there may be less delay between when the CSI information is determined and when beamsteering based on the CSI is applied, as compared to other beamsteering calculation implementations, and thus there may be less time for the CSI information to become outdated. For instance, in one embodiment, a beamformee receives a sounding packet and processes the sounding packet during the time period 402. CSI may be determined based on the sounding packet. Then, during the time period 408, beamsteering codebook selection may be performed based on the CSI. Next, during the time period 404, an indication of the selected codeword(s) in the codebook may be transmitted to the beamformer in the immediately subsequent packet. In another embodiment, a beamformer receives a packet that includes CSI (transmitted from the beamformee) during the time period 402. Then, during the time period 408, beamsteering codebook selection may be performed based on the CSI. Next, during the time period 404, the selected codeword(s) may be utilized to perform beamsteering when transmitting the immediately subsequent packet to the beamformee.

Figure 10:
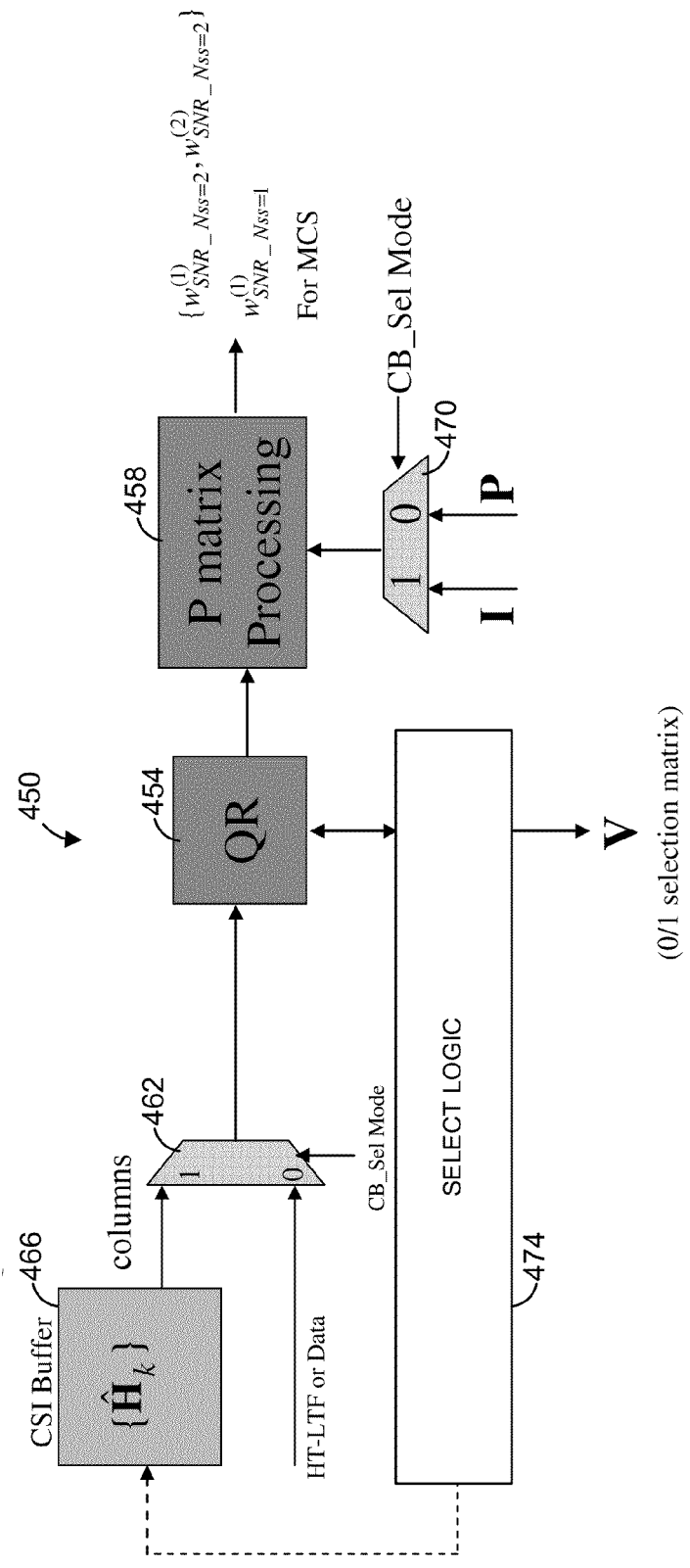
FIG. 10 is a block diagram of an example matrix equalizer computational block that can be utilized to perform beamsteering calculations, such as codebook selection calculations.

FIG. 10 is a block diagram of an example matrix equalizer computational block 450 that can be utilized to perform beamsteering calculations, such as codebook selection calculations. Similar to the matrix equalizer computational block 300 of FIGS. 5A and 6A, the block 450 includes a QR decomposition processor 454 which may be the same as or similar to the QR decomposition processor 304 of FIGS. 5A and 6A. The QR decomposition processor 454 is coupled to a Q memory and an R memory (not shown). In one embodiment, the QR decomposition processor 454 implements an algorithm that will be described with reference to FIG. 5B. The QR decomposition processor 454 is coupled to a P matrix processing block 458, which may be the same as or similar to the P matrix processing block 308 of FIGS. 5A and 6A.

The block 450 may include a multiplexer 462 coupled to an input of the QR decomposition processor 454. The multiplexer 462 may be utilized to provide data from a CSI buffer 466 as input to the QR decomposition processor 454 during a beamsteering calculation period of the block 450, such as in the gap between the time periods 402 and 404 discussed with reference to FIG. 9. The block 450 also may include a multiplexer 470 coupled to an input of the P matrix processing block 454. The multiplexer 470 may be utilized to provide an identity matrix I as input to the P matrix processing block 454 during the beamsteering calculation period of the block 450.

The block 450 also may include select logic 474 that may select columns in a steering matrix codebook and/or generate a matrix V such as described above. The select logic 474 may be coupled to the QR decomposition processor 454, the Q memory and the R memory. The select logic 474 also may be coupled to the CSI buffer 466. The select logic 474 may select columns in a steering matrix codebook and/or generate the matrix V based on the output of the QR decomposition processor 454 and/or data in the R memory. Additionally, the select logic 474 may modify data in the Q memory and the R memory during the codebook selection processing. Further, the select logic 474 may modify data in the CSI buffer 466 or control whether particular data in the CSI buffer 466 is provided to the QR decomposition processor 454.

In one embodiment, channel estimate data (i.e., $\hat{H}_k$, where k is the tone index) for groups of four tones is associated, and only every $4^{th}$ tone is operated on by the block 450. In other words, codebook selection data is generated based on channel estimate data for every $4^{th}$ tone. For example, codebook selection data may be generated based on channel estimate data for a first tone, and this codebook selection data may be used for the first, second, third, and fourth tones. This permits beamsteering calculations to be completed by the block 450 within the period in which the matrix equalization block would otherwise be idle (e.g., such as between the two time periods 402 and 404 of FIG. 9). In other embodiments, channel estimate data (i.e., $\hat{H}_k$, where k is the tone index) for more or less than every $4^{th}$ tone may be operated on by the block 450. If more than every $4^{th}$ tone is to be operated upon, the block 450 may be modified to include more physical CORDIC engines, or to be able to operate at a higher speed so that more virtual CORDIC engines may be operated. A more detailed explanation of the operation of the block 450 will be described with reference to FIGS. 11-14.

Figure 11:
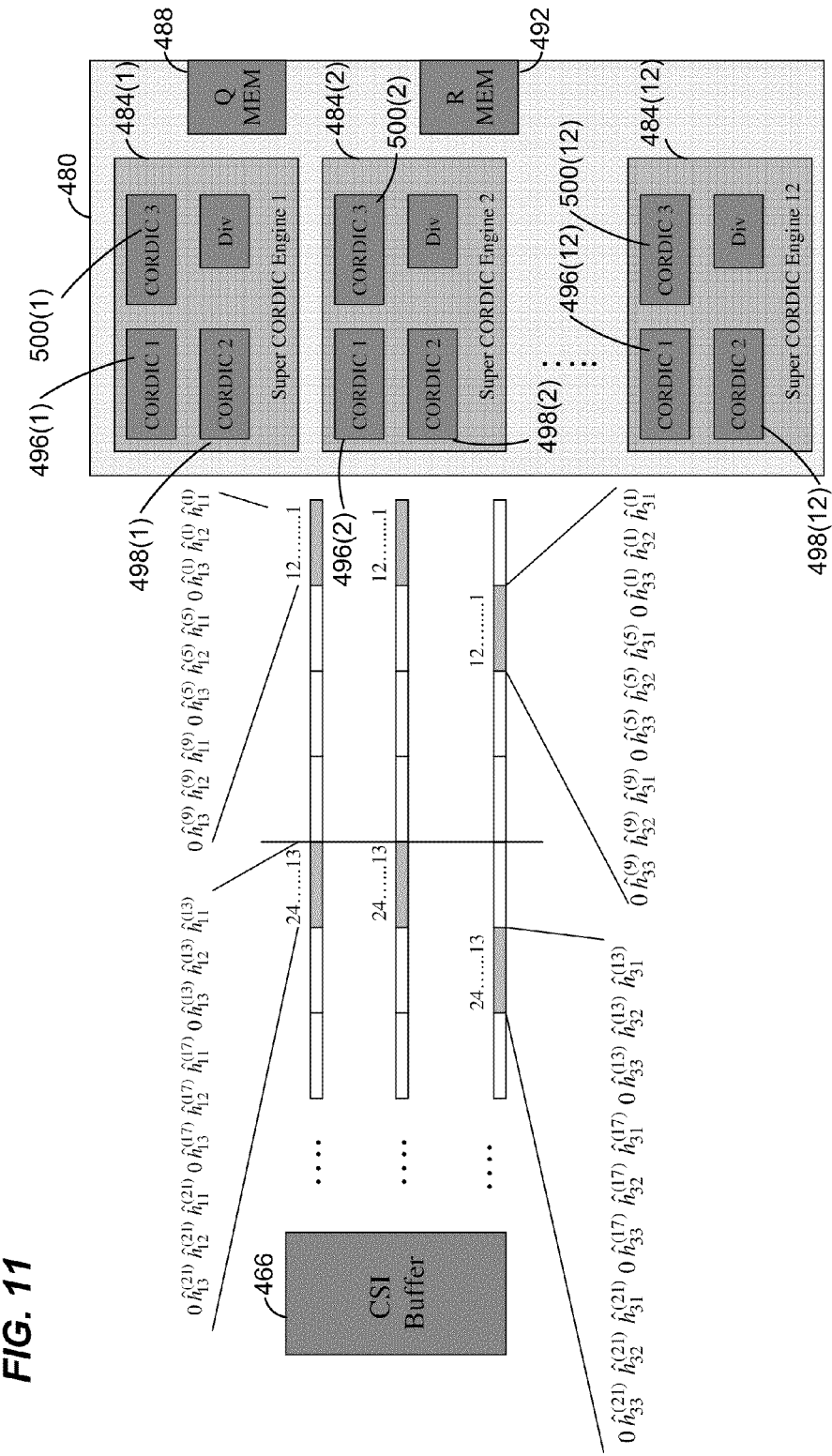
FIG. 11 is a block diagram of an example QR decomposition processor that can be utilized to perform beamsteering calculations, such as codebook selection calculations.

FIG. 11 is a block diagram illustrating one example QR decomposition block 480, which may be the same as or similar to the block 350 of FIG. 7. The QR decomposition processor 480 may be utilized as the decomposition processor 454 of FIG. 10. The QR decomposition processor 480 includes twelve CORDIC engines 484 coupled to a Q memory 488 and an R memory 492. Although twelve CORDIC engines 484 are illustrated in FIG. 11, there may be more or less than twelve physical CORDIC engines 484. For example, in some implementations, a physical CORDIC engine 484 may be time-shared so that it acts as multiple "virtual" CORDIC engines 484. As another example, if operation in a 40 MHz mode is to be supported, there may be thirteen virtual or physical CORDIC engines 484. In the example of FIG. 11, each CORDIC engine 484 includes three CORDIC calculation blocks 496, 498, 500. In other implementations, each CORDIC engine 484 may include less than or more than three CORDIC calculation blocks.

In the example of FIG. 11, there are three transmit antennas (i.e., $N_{TX}=3$) and there are two streams (i.e., $N_{SS}=2$). Thus, in FIG. 11, received data corresponds to channel estimate data (i.e., $\hat{H}_k$, which is a 3×3 matrix). In particular, $\hat{h}_{jn}^{(k)}$ is the element of $\hat{H}_k$ at the $n^{th}$ column and the $j^{th}$ row, where k is the tone index:

$$\hat{H}_k = \begin{bmatrix} \hat{h}_{11}^{(k)} & \hat{h}_{12}^{(k)} & \hat{h}_{13}^{(k)} \\ \hat{h}_{21}^{(k)} & \hat{h}_{22}^{(k)} & \hat{h}_{23}^{(k)} \\ \hat{h}_{31}^{(k)} & \hat{h}_{32}^{(k)} & \hat{h}_{33}^{(k)} \end{bmatrix} \quad \text{(Equation 1)}$$

As discussed above, in one embodiment, channel estimate data for only every $4^{th}$ tone is provided to the block 480. For example, channel estimate data being fed to the block 480 may be $\hat{H}_1, \hat{H}_5, \hat{H}_9, \hat{H}_{13}, \ldots$.

Each column of a matrix $\hat{H}_k$ provided to the block 480 may be processed by a separate CORDIC engine 484. Thus, the columns of a matrix $\hat{H}_k$ may be processed in parallel by the block 480. This is unlike the processing of HT-LTFs, where each CORDIC engine 354 operates on HT-LTF data corresponding to a different tone.

The scheduling of the QR decomposition processor 480 may be essentially the same as the schedule illustrated in FIG. 8. For example, in a first time period, the QR decomposition processor 480 may receive channel estimate data corresponding to two rows for each of three tones. In this time period, the blocks 496 and 498 may compute the rotation angles $\phi_1$ and $\phi_2$ for each of columns of each of $\hat{H}_1, \hat{H}_5, \hat{H}_9$. In a second time period, the QR decomposition processor 480 receives channel estimate data corresponding to the third row for each of the three tones. In this second time period, the blocks 500 may compute the rotation angles $\phi_3$ for each of columns of each of $\hat{H}_1, \hat{H}_5, \hat{H}_9$. In a third time period, the blocks 496 and 498 may compute the rotation angles $\theta_1$ for each of columns of each of $\hat{H}_1, \hat{H}_5, \hat{H}_9$. In a fourth time period, the blocks 496 and 498 may compute the rotation angles $\theta_2$ for each of columns of each of $\hat{H}_1, \hat{H}_5, \hat{H}_9$.

After the rotation angle $\theta_2$ has been calculated, the R memory will include the norms of each of the columns of $\hat{H}_k$. For example, if $\hat{H}_k$ is a 3×3 matrix, the R memory will include values $r_{11\_1}, r_{11\_2},$ and $r_{11\_3}$ for the three columns of $\hat{H}_k$, where the values $r_{11\_1}, r_{11\_2},$ and $r_{11\_3}$ are the norms of the first, second, and third columns, respectively, of $\hat{H}_k$. Referring again to FIG. 10, the select logic 474 may select the column with the largest norm (i.e., $r_{11}$ value) and generate the first column of V to indicate the selected column.

Referring again to FIG. 11, the Q and R memories are then updated, as will be described in more detail below. Next, assuming that $\hat{H}_k$ is a 3×3 matrix, the remaining two columns of $\hat{H}_k$ (i.e., the unselected columns) are fed back to the QR decomposition processor 480 and are processed in parallel in a manner that will be described in more detail below. After the two remaining columns have been processed, the R memory will include the projections of the two columns to the null space of the first selected column. For example, if $\hat{H}_k$ is a 3×3 matrix, the R memory will include values $r_{22\_1}$ and $r_{22\_2}$, for the two unselected columns of $\hat{H}_k$, where the values $r_{22\_1}$ and $r_{22\_2}$ are the projections of the unselected columns of $\hat{H}_k$ onto the null space of the first column. Referring again to FIG. 10, the select logic 474 may select the column with the largest projection (i.e., $r_{22}$ value) and generate the second column of V to indicate the second selected column.

If there a more columns to select, the method may proceed similarly.

Figure 12:
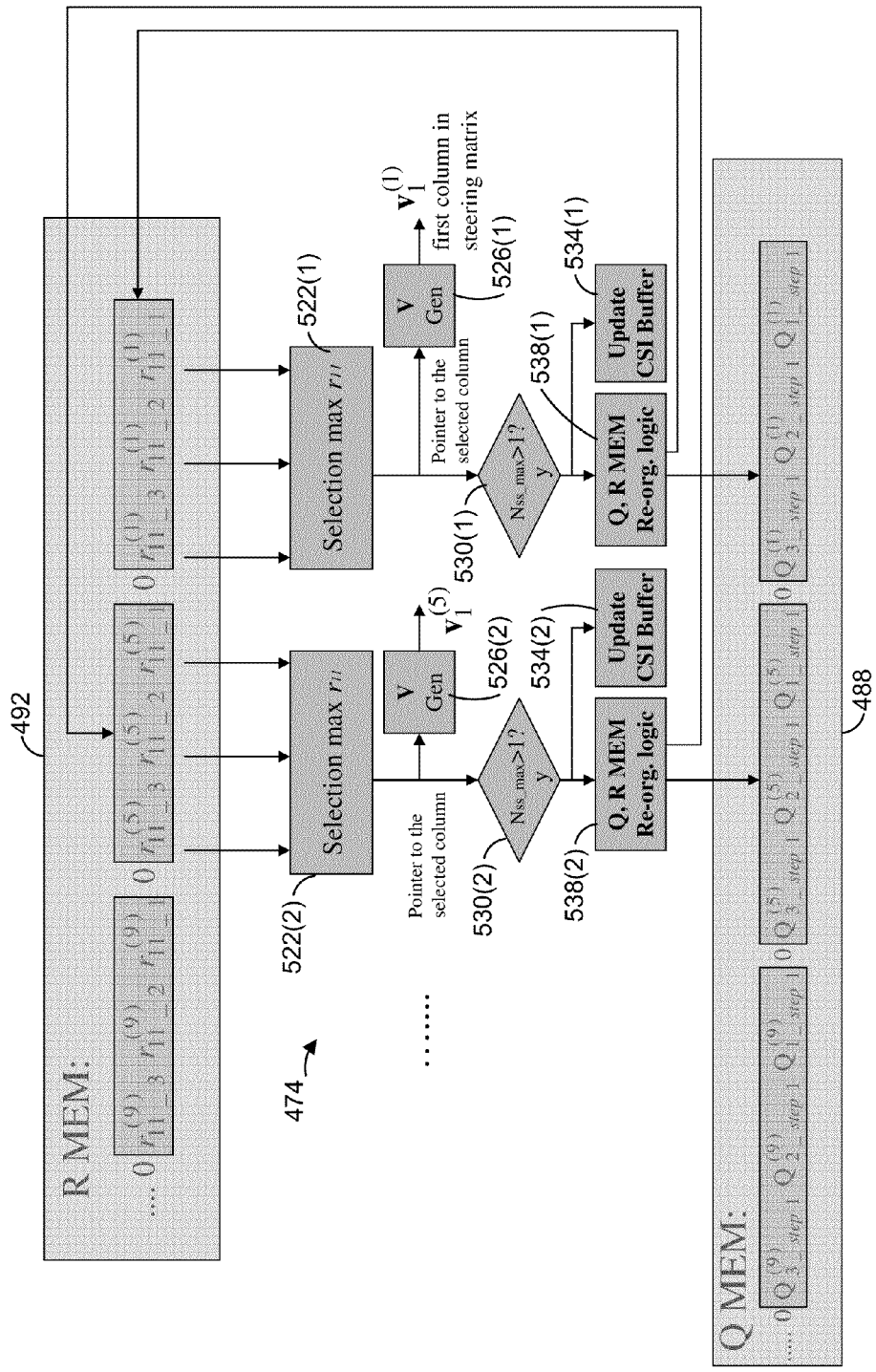
FIG. 12 is a diagram illustrating an example operation of the select logic block of FIG. 10 in selecting a first column of a beamsteering codebook.

FIG. 12 is a diagram illustrating example operation of the select logic 474 in selecting the first column. In the example of FIG. 12, it is assumed that $\hat{H}_k$ is a 3×3 matrix, and it is assumed that the three columns of $\hat{H}_k$ have been processed by the QR decomposition processor 480. The R memory 492 is illustrated as having stored therein the values $r_{11\_1}, r_{11\_2},$ and $r_{11\_3}$ for the three columns of each of the $\hat{H}_k$ matrices. Additionally, the Q memory 488 is illustrated as having stored therein the Givens rotations for the three columns of each of the $\hat{H}_k$ matrices, where:

$$Q_{j\_step1}^{(k)} = \{\phi_{1\_j\_step1}^{(k)}, \phi_{2\_j\_step1}^{(k)}, \phi_{1\_j\_step1}^{(k)}, \theta_{1\_j\_step1}^{(k)}, \theta_{2\_j\_step1}^{(k)}\} \quad \text{(Equation 2)}$$

for the $j^{th}$ column in the $k^{th}$ tone.

At a block 522, the column of $\hat{H}_k$ corresponding to the maximum of the values $r_{11\_1}, r_{11\_2},$ and $r_{11\_3}$ is determined. At a block 526, the first column of V is generated. In particular, if it is determined at the block 522 that the $j^{th}$ column corresponds to the maximum of $r_{11\_1}, r_{11\_2},$ and $r_{11\_3}$, then the $j^{th}$ row of the first column of V is set to one, and the other elements of the first column are set to zero. If there are more columns to select (block 530), the flow may proceed to block 534.

At the block 534, the CSI buffer 466 may be updated so that the selected column will not be processed by the QR calculation block 480 in any subsequent steps. For example, the selected column can be set to zero. Alternatively, an indication that the column has been selected may be stored in a storage element. The storage element may be examined at subsequent QR calculation steps to determine which columns should not be further processed. The matrix $\hat{H}_k$ without the selected column will be referred to as $\hat{\hat{H}}_k$. If $\hat{H}_k$ is a 3×3 matrix, then:

$$\hat{\hat{H}}_k = \begin{bmatrix} \hat{\hat{h}}_{11}^{(k)} & \hat{\hat{h}}_{12}^{(k)} \\ \hat{\hat{h}}_{21}^{(k)} & \hat{\hat{h}}_{22}^{(k)} \\ \hat{\hat{h}}_{31}^{(k)} & \hat{\hat{h}}_{32}^{(k)} \end{bmatrix} \quad \text{(Equation 3)}$$

At a block 538, the Q memory 488 and the R memory 492 may be reorganized so that the rotations corresponding to the selected column are used in subsequent selection steps. With respect to the Q memory 488, for instance, if the Givens rotations corresponding to the selected column are $Q_{s1\_step1}^{(k)}$, then all of the remaining Givens rotations, $Q_{j\_step1}^{(k)}$, for $\forall j=1, 2, 3$, are set to $Q_{s1\_step1}^{(k)}$ in the Q memory 488. With respect to the R memory 492, if the $r_{11}$ value corresponding to the selected column is $r_{11\_s1}$, then all of the remaining $r_{11\_j}$, for $\forall j=1, 2, 3$, are set to $r_{11\_s1}$.

Figure 13:
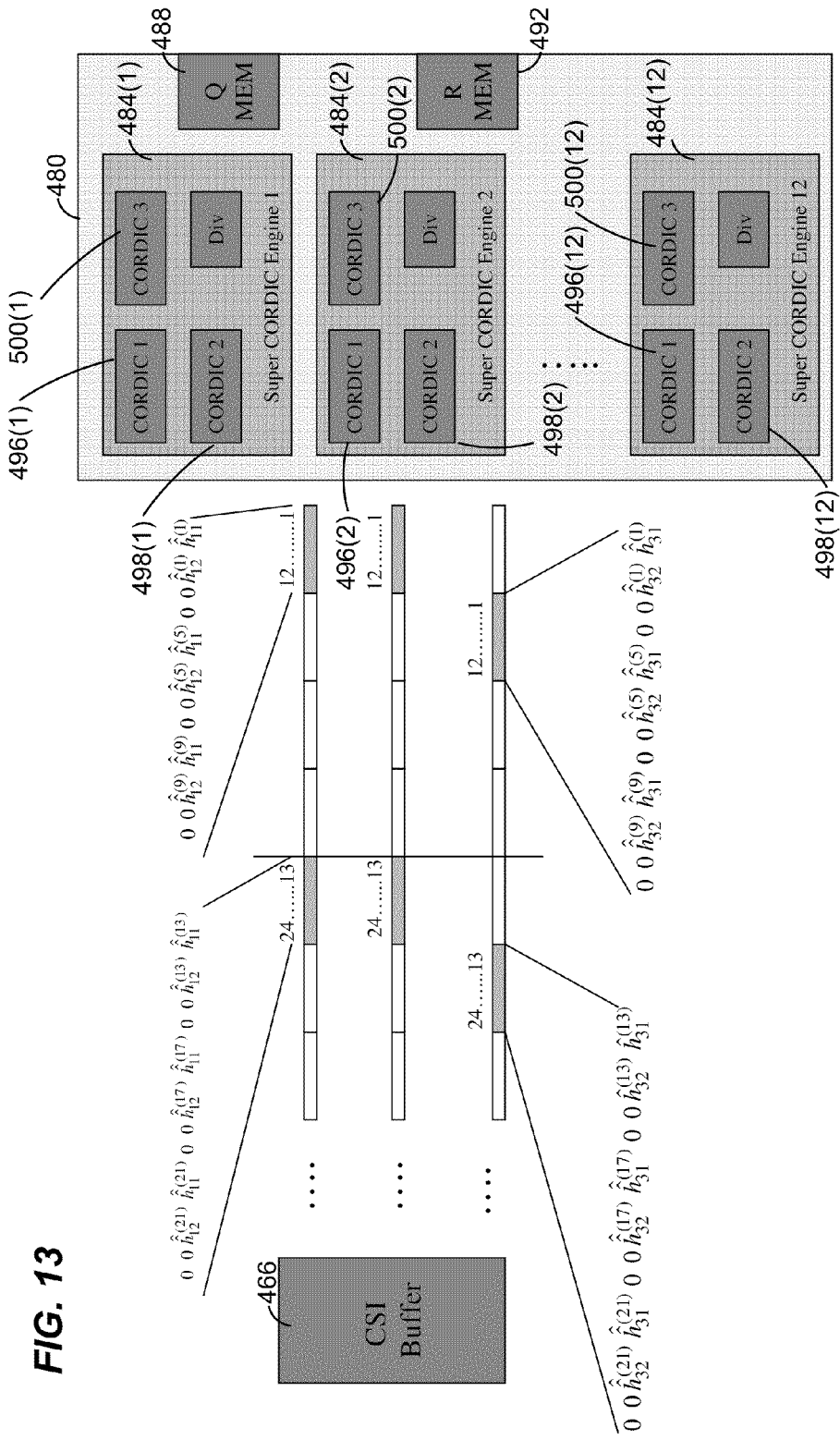
FIG. 13 is a block diagram of the example QR decomposition processor of FIG. 11 operating during a second step of a codebook selection process.

FIG. 13 is a block diagram illustrating the example QR decomposition processor 480 operating on the matrices $\hat{H}_k$. As discussed above, in one embodiment, channel estimate data for only every $4^{th}$ tone is provided to the QR decomposition processor 480. For example, channel estimate data being fed to the QR decomposition processor 480 may be $\hat{H}_1$, $\hat{H}_5$, $\hat{H}_9$, $\hat{H}_{13}$, . . . .

The Q memory 488 may include the Givens rotations as set at the block 538 (FIG. 12). Similarly, the R memory 492 may include the $r_{11}$ values as set at the block 538 (FIG. 12). Each column of a matrix $\hat{H}_k$ provided to the QR decomposition processor 480 may be processed by a separate CORDIC engine 484. Thus, the columns of a matrix $\hat{H}_k$ may be processed in parallel by the QR decomposition processor 480.

The scheduling of the QR decomposition processor 480 may be essentially the same as the schedule illustrated in FIG. 8. For example, in a first time period, the QR decomposition processor 480 may receive channel estimate data corresponding to two rows for each of three tones. In this time period, the blocks 496 and 498 may compute the rotation angles $\phi_1$ and $\phi_2$ for each of columns of each of $\hat{H}_1$, $\hat{H}_5$, $\hat{H}_9$. In a second time period, the QR decomposition processor 480 receives channel estimate data corresponding to the third row for each of the three tones. In this second time period, the blocks 500 may compute the rotation angles $\phi_3$ for each of columns of each of $\hat{H}_1$, $\hat{H}_5$, $\hat{H}_9$. In a third time period, the blocks 496 and 498 may compute the rotation angles $\theta_1$ for each of columns of each of $\hat{H}_1$, $\hat{H}_5$, $\hat{H}_9$. In a fourth time period, the blocks 496 and 498 may compute the rotation angles $\theta_2$ for each of columns of each of $\hat{H}_1$, $\hat{H}_5$, $\hat{H}_9$.

After the rotation angle $\theta_2$ has been calculated, the R memory will include values $r_{11}$, $r_{12}$, and $r_{22}$ for the two columns of $\hat{H}_k$, where the values $r_{22}$ are the projections of the first and second columns onto the null space of the first selected column. Referring again to FIG. 10, the select logic 474 may select the column with the largest projection (i.e., $r_{22}$ value) and generate the next column of V to indicate the selected column.

Figure 14:
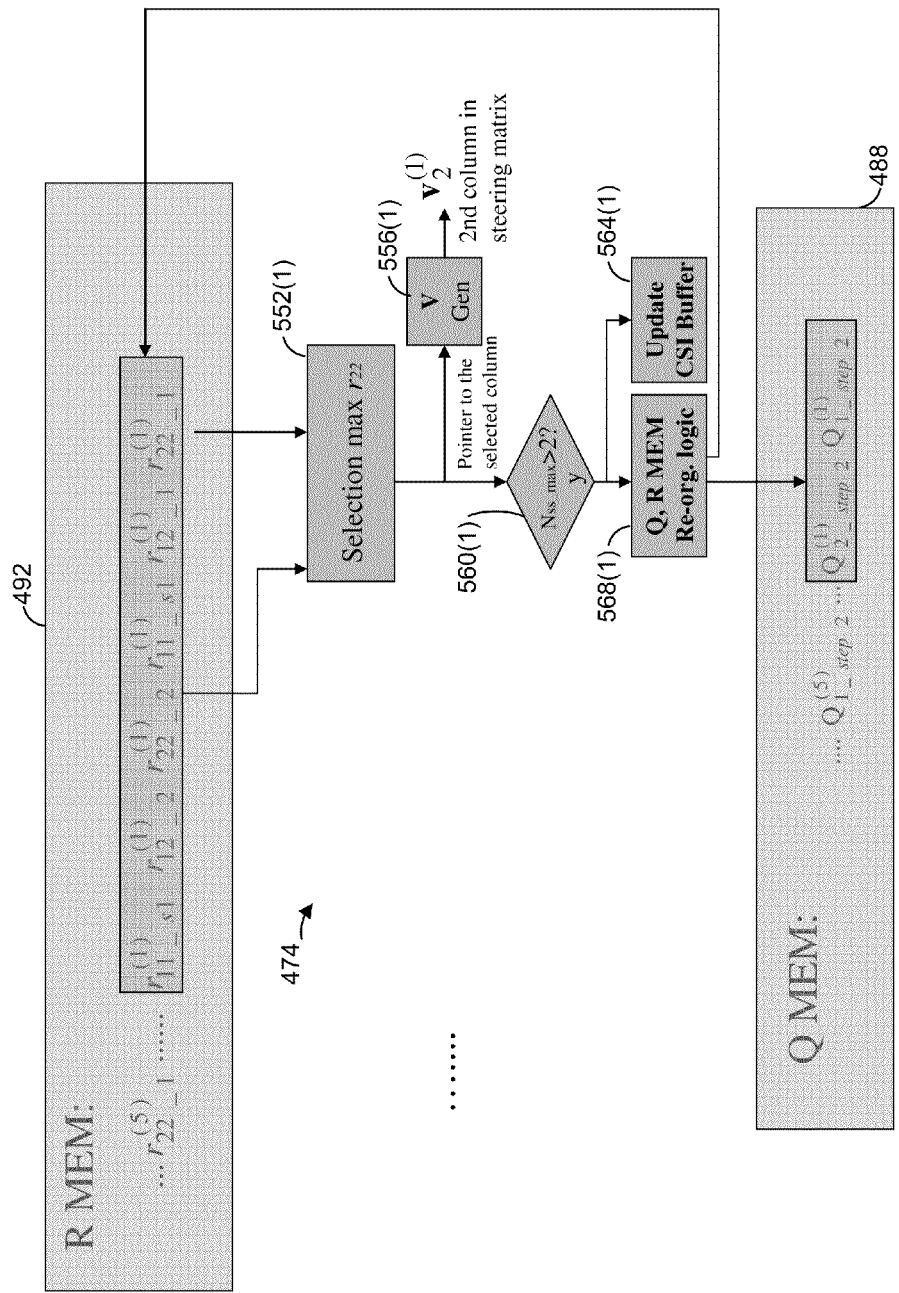
FIG. 14 is a diagram illustrating an example operation of the select logic block of FIG. 10 in selecting a second column of the beamsteering codebook.

FIG. 14 is a diagram illustrating example operation of the select logic 474 in selecting the second column. In the example of FIG. 14, it is assumed that $\hat{H}_k$ is a 3×2 matrix, and it is assumed that the two columns of $\hat{H}_k$ have been processed by the QR decomposition processor 480. The R memory 492 is illustrated as having stored therein the values $r_{11\_s1}$, $r_{12\_1}$, and $r_{22\_1}$ for the first column of each of $\hat{H}_k$, and the $r_{11\_s1}$, $r_{12\_2}$, and $r_{22\_2}$ for the second column of each of $\hat{H}_k$. Additionally, the Q memory 488 is illustrated as having stored therein the Givens rotations for the two columns of each of the $\hat{H}_k$ matrices, where:

$$Q_{j\_step2}^{(k)} = \{\phi_{1\_s1\_step1}^{(k)}, \phi_{2\_s1\_step1}^{(k)}, \\ \phi_{1\_s1\_step1}^{(k)}, \theta_{1\_s1\_step1}^{(k)}, \theta_{2\_s1\_step1}^{(k)}, \\ \phi_{4\_j1\_step2}^{(k)}, \phi_{5\_j\_step2}^{(k)}, \phi_{3\_j\_step2}^{(k)}\}$$ (Equation 4)

for the $i^{th}$ column in the $k^{th}$ tone, in the second step.

At a block 552, the column of $\hat{H}_k$ corresponding to the maximum of the values $r_{22\_1}$ and $r_{22\_2}$ is determined. At a block 556, the second column of V is generated. In particular, if it is determined at the block 552 that the $j^{th}$ column corresponds to the maximum of $r_{22\_1}$ and $r_{22\_2}$, then the $j^{th}$ row of the second column of V is set to one, and the other elements of the second column are set to zero. If there are more columns to select (block 560), the flow may proceed to block 564.

At the block 564, the CSI buffer 466 may be updated so that the selected column will not be processed by the QR decomposition processor 480 in any subsequent steps. For example, the selected column can be set to zero. Alternatively, an indication that the column has been selected may be stored in a storage element. The storage element may be examined at subsequent QR calculation steps to determine which columns should not be further processed.

At a block 568, the Q memory 488 and the R memory 492 may be reorganized so that the rotations corresponding to the selected column are used in subsequent selection steps. With respect to the Q memory 488, for instance, if the Givens rotations corresponding to the second selected column are $Q_{s2\_step2}^{(k)}$, then all of the remaining Givens rotations, $Q_{j\_step2}^{(k)}$, for ∀j=1, 2, are set to $Q_{s2\_step2}^{(k)}$ in the Q memory 488. With respect to the R memory 492, if the $r_{12}$ and $r_{22}$ values corresponding to the selected column are $r_{12\_s2}$ and $r_{22\_s2}$ values, then all of the remaining $r_{12\_j}$ and $r_{22\_j}$, for •j=1, 2, are set to $r_{12\_2}$ and $r_{22\_2}$, respectively.

As discussed above, the matrix equalizer block also may be utilized to perform calculations other than codebook selection. Referring to FIG. 10, the P matrix processing block 458 (i.e., P matrix processor) may be utilized to generate post-matrix equalization (post-MEQ) signal-to-noise (SNR) information. Such post-MEQ SNR information may be useful for modulation coding selection (MCS), for example.

The P matrix processing block 458 may be utilized for calculation of the post-MEQ SNR information after the codebook selection process described above is completed. Then, the R memory 492 will include values $r_{11}^{(k)}$, $r_{12}^{(k)}$ and $r_{22}^{(k)}$ for each tone k. Additionally, the P matrix processing block 458 is provided the identity matrix I rather than the P matrix. An SNR for a first stream in a two-stream transmission may then be determined as:

$$\frac{1}{w_{SNR\_Nss=2}^{(1)}} = \frac{1}{r_{11}^{(k)2}} + \frac{\|r_{12}^{(k)}\|^2}{r_{11}^{(k)2} r_{22}^{(k)2}}$$ (Equation 5)

An SNR for a second stream in the two-stream transmission may be determined as:

$$\frac{1}{w_{SNR\_Nss=2}^{(2)}} = \frac{1}{r_{22}^{(k)2}}$$ (Equation 6)

An SNR for one-stream transmission may be determined as:

$$\frac{1}{w_{SNR\_Nss=1}^{(1)}} = \frac{1}{r_{11}^{(k)2}}$$ (Equation 7)

The P matrix processing block, such as the block 308 of FIG. 5A, is capable of calculating the Equations 5 and 6. Thus, the P matrix processing block 458 of FIG. 10 may include relatively straightforward additional processing capability to calculate the Equation 7.

Many variations to the above described codebook methods and apparatus are contemplated. For example, in some embodiments, generation of the matrix V may be omitted. For instance, if codebook selection is implemented based on CSI feedback, columns of $Q_{k,sounding}$ can be directly selected to be included in $Q_{k,steering}$.

As another example, if Nss=1, then additional processing availability may be utilized for implementing codebook selection from an extended codebook. For example, if there are six codewords q1-q6 in the codebook, then channel estimation information corresponding to, say, the codewords q1-q4 (i.e., H.q1, H.q2, H.q3, H.q4) of one tone may be provided to the QR decomposition processor 480 in the first step. Without making a column selection, channel estimation information corresponding to codewords q5 and q6 (i.e., H.q5 and H.q6) of the tone may be provided to the QR decomposition processor 480 in the second step. After the second step, the selection step may be applied. For example, the codeword corresponding to the largest norm over H.q1-H.q6 of one tone may be selected.

The matrix equalizer reuse techniques described above may be utilized in various MIMO devices. For example, matrix equalizer reuse for beamsteering techniques such as described above may be utilized in base stations, access points, wireless routers, etc. Additionally, FIGS. 15A-15F illustrate various devices in which matrix equalizer reuse for beamsteering techniques such as described above, may be employed.

Figure 15A:
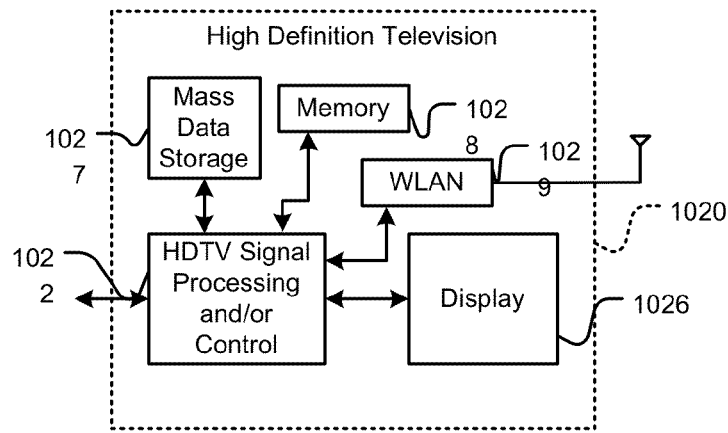
FIG. 15A is a block diagram of a high definition television that may utilize matrix equalizer reuse techniques such as described herein.

Referring now to FIG. 15A, such techniques may be utilized in a high definition television (HDTV) 1020. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 may implement matrix equalizer reuse for beamsteering techniques such as described above.

Figure 15B:
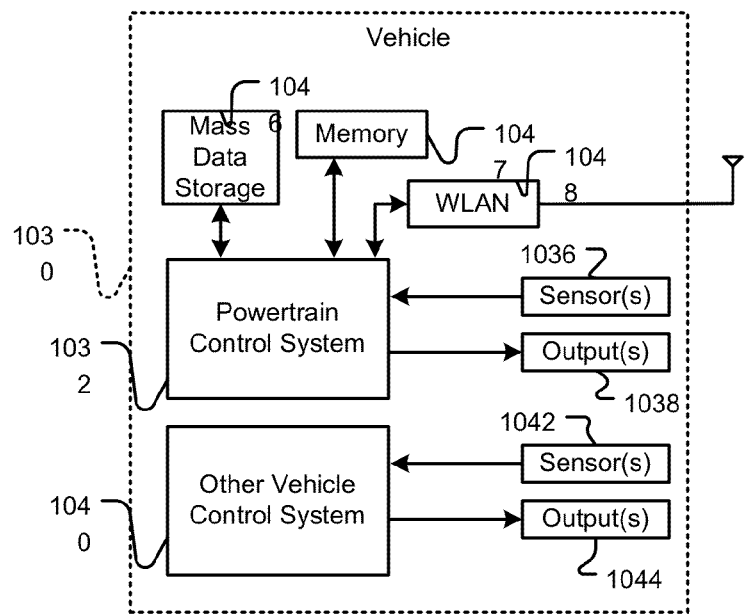
FIG. 15B is a block diagram of a vehicle that may utilize matrix equalizer reuse techniques such as described herein.

Referring now to FIG. 15B, such techniques may be utilized in a vehicle 1030. The vehicle 1030 includes a control system that may include mass data storage 1046, as well as a WLAN interface 1048. The mass data storage 1046 may support a powertrain control system 1032 that receives inputs from one or more sensors 1036 such as temperature sensors, pressure sensors, rotational sensors, airflow sensors and/or any other suitable sensors and/or that generates one or more output control signals 1038 such as engine operating parameters, transmission operating parameters, and/or other control signals.

Control system 1040 may likewise receive signals from input sensors 1042 and/or output control signals to one or more output devices 1044. In some implementations, control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like.

Powertrain control system 1032 may communicate with mass data storage 1027 that stores data in a nonvolatile manner such as optical and/or magnetic storage devices. The mass storage device 1046 may be a mini HDD that includes one or more platters having a diameter that is smaller than approximately 1.8". Powertrain control system 1032 may be connected to memory 1047 such as RAM, ROM, low latency nonvolatile memory such as flash memory and/or other suitable electronic data storage. Powertrain control system 1032 also may support connections with a WLAN via a WLAN network interface 1048. The control system 1040 may also include mass data storage, memory and/or a WLAN interface (all not shown). In one exemplary embodiment, the WLAN network interface 1048 may implement matrix equalizer reuse for beamsteering techniques such as described above.

Figure 15C:
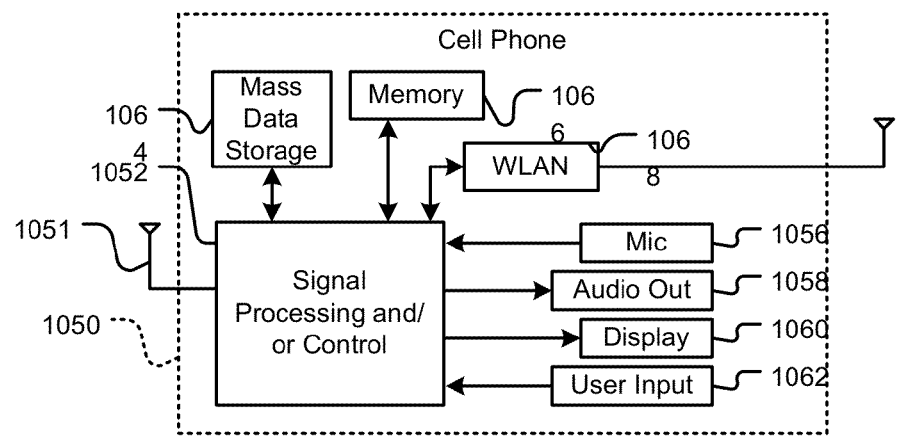
FIG. 15C is a block diagram of a cellular phone that may utilize matrix equalizer reuse techniques such as described herein.

Referring now to FIG. 15C, such techniques may be used in a cellular phone 1050 that may include a cellular antenna 1051. The cellular phone 1050 may include either or both signal processing and/or control circuits, which are generally identified in FIG. 15C at 1052, a WLAN network interface 1068 and/or mass data storage 1064 of the cellular phone 1050. In some implementations, cellular phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in cellular phone 1050 may process data, perform coding and/or encryption, perform calculations, format data and/or perform other cellular phone functions.

Cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Cellular phone 1050 may be connected to memory 1066 such as RAM, ROM, low latency nonvolatile memory such as flash memory and/or other suitable electronic data storage. Cellular phone 1050 also may support connections with a WLAN via a WLAN network interface 1068. The WLAN network interface 1068 may implement matrix equalizer reuse for beamsteering techniques such as described above.

Figure 15D:
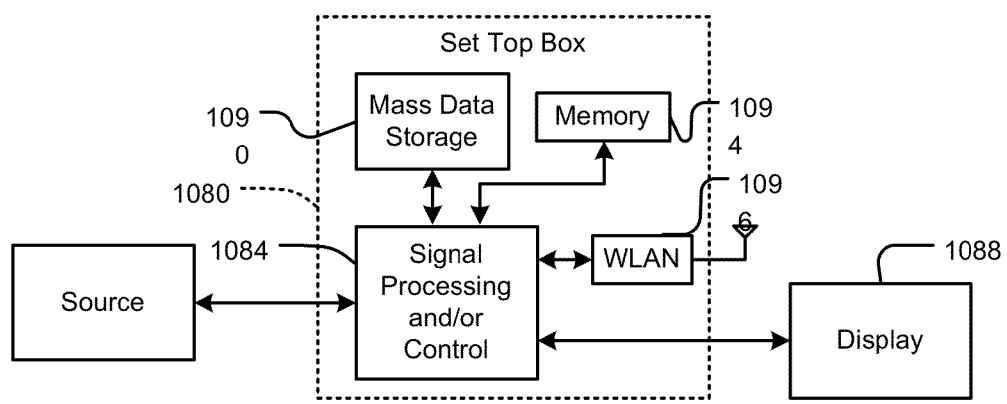
FIG. 15D is a block diagram of a set top box that may utilize matrix equalizer reuse techniques such as described herein.

Referring now to FIG. 15D, such techniques may be utilized in a set top box 1080. The set top box 1080 may include either or both signal processing and/or control circuits, which are generally identified in FIG. 15D at 1084, a WLAN interface and/or mass data storage 1090 of the set top box 1080. Set top box 1080 receives signals from a source such as a broadband source and outputs standard and/or high definition audio/video signals suitable for a display 1088 such as a television and/or monitor and/or other video and/or audio output devices. Signal processing and/or control circuits 1084 and/or other circuits (not shown) of the set top box 1080 may process data, perform coding and/or encryption, perform calculations, format data and/or perform any other set top box function.

Set top box 1080 may communicate with mass data storage 1090 that stores data in a nonvolatile manner and may use jitter measurement. Mass data storage 1090 may include optical and/or magnetic storage devices for example hard disk drives HDD and/or DVDs. The HDD may be a mini HDD that includes one or more platters having a diameter that is smaller than approximately 1.8". Set top box 1080 may be connected to memory 1094 such as RAM, ROM, low latency nonvolatile memory such as flash memory and/or other suitable electronic data storage. Set top box 1080 also may support connections with a WLAN via a WLAN network interface 1096. The WLAN network interface 1096 may implement matrix equalizer reuse for beamsteering techniques such as described above.

Figure 15E:
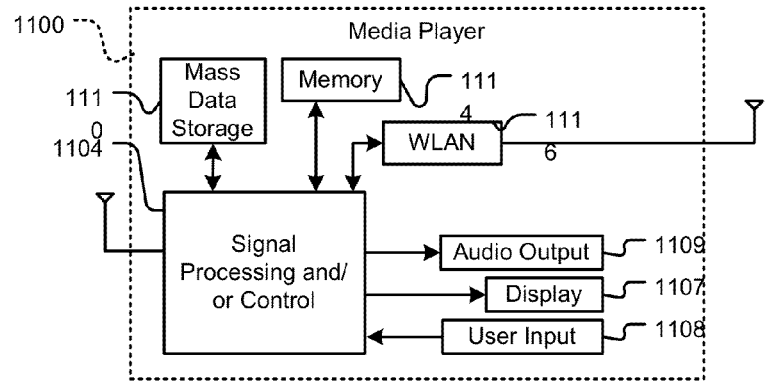
FIG. 15E is a block diagram of a media player that may utilize matrix equalizer reuse techniques such as described herein.

Referring now to FIG. 15E, such techniques may be used in a media player 1100. The media player 1100 may include either or both signal processing and/or control circuits, which are generally identified in FIG. 15E at 1104, a WLAN interface and/or mass data storage 1110 of the media player 1100. In some implementations, media player 1100 includes a display 1107 and/or a user input 1108 such as a keypad, touchpad and the like. In some implementations, media player 1100 may employ a graphical user interface (GUI) that typically employs menus, drop down menus, icons and/or a point-and-click interface via display 1107 and/or user input 1108. Media player 1100 further includes an audio output 1109 such as a speaker and/or audio output jack. Signal processing and/or control circuits 1104 and/or other circuits (not shown) of media player 1100 may process data, perform coding and/or encryption, perform calculations, format data and/or perform any other media player function.

Media player 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media player 1100 may be connected to memory 1114 such as RAM, ROM, low latency nonvolatile memory such as flash memory and/or other suitable electronic data storage. Media player 1100 also may support connections with a WLAN via a WLAN network interface 1116. The WLAN network interface 1116 may implement matrix equalizer reuse for beamsteering techniques such as described above.

Figure 15F:
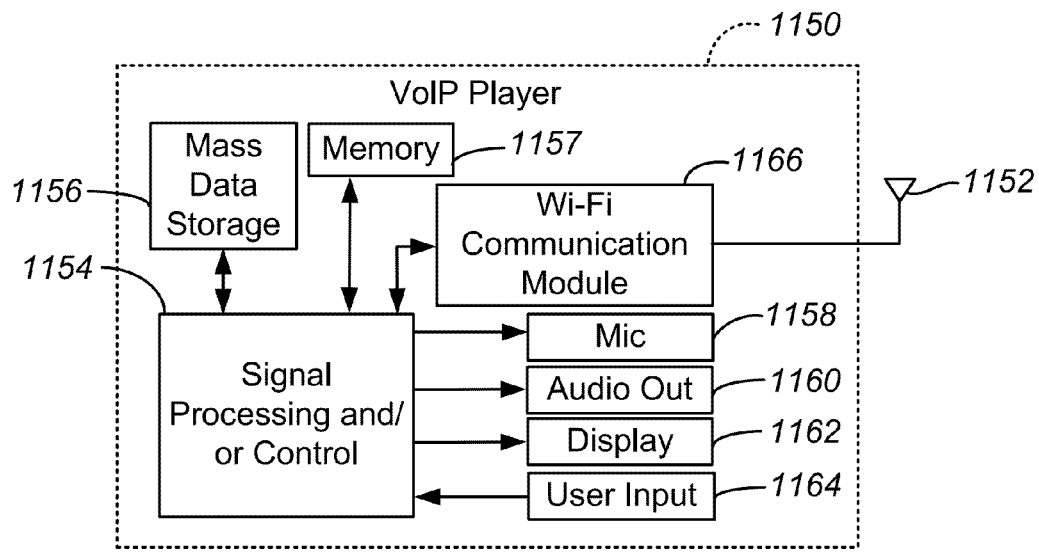
FIG. 15F is a block diagram of a voice over IP device that may utilize matrix equalizer reuse techniques such as described herein.

Referring to FIG. 15F, such techniques may be utilized in a Voice over Internet Protocol (VoIP) phone 1150 that may include an antenna 1152. The VoIP phone 1150 may include either or both signal processing and/or control circuits, which are generally identified in FIG. 15F at 1154, a wireless interface and/or mass data storage of the VoIP phone 1150. In some implementations, VoIP phone 1150 includes, in part, a microphone 1158, an audio output 1160 such as a speaker and/or audio output jack, a display monitor 1162, an input device 1164 such as a keypad, pointing device, voice actuation and/or other input devices, and a Wireless Fidelity (WiFi) communication module 1166. Signal processing and/or control circuits 1154 and/or other circuits (not shown) in VoIP phone 1150 may process data, perform coding and/or encryption, perform calculations, format data and/or perform other VoIP phone functions.

VoIP phone 1150 may communicate with mass data storage 1156 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 1150 may be connected to memory 1157, which may be a RAM, ROM, low latency nonvolatile memory such as flash memory and/or other suitable electronic data storage. VoIP phone 1150 is configured to establish communications link with a VoIP network (not shown) via WiFi communication module 1166. The WiFi communication module 1166 may implement matrix equalizer reuse for beamsteering techniques such as described above.

At least some of the various blocks, operations, and techniques described above may be implemented in hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. A method, comprising:
    receiving channel state information (CSI);
    selecting for an input of a matrix equalizer computational device of a matrix equalizer either i) a signal to be equalized or ii) the CSI, including selecting the CSI at a time when matrix computation circuitry of the matrix equalizer computational device is not needed for matrix equalization;
    when the signal is selected for the input of the matrix equalizer computational device,
        providing the signal to the input of the matrix equalizer computational device, and
        applying an equalizer to the signal, wherein the signal is i) to be transmitted via at least one multiple input, multiple output (MIMO) channel or ii) received via the at least one MIMO channel, and wherein the equalizer is generated using the matrix computation circuitry of the matrix equalizer computational device; and
    when the CSI is selected for the input of the matrix equalizer computational device,
        providing the CSI to the input of the matrix equalizer computational device,
        performing a beamsteering calculation by reusing the matrix computation circuitry of the matrix equalizer computational device, wherein the beamsteering calculation is based on the CSI, and
        selecting one or more transmit beamsteering codewords from a transmit beamsteering codebook based on an output of the beamsteering calculation performed by the matrix equalizer computational device in response to the CSI provided to the matrix equalizer computational device.

2. The method of claim 1, wherein providing the CSI to the input of the matrix equalizer computational device includes providing the CSI to the input of the matrix equalizer computational device in a plurality of steps, wherein at each step a subset of the CSI provided at the previous step is provided to the input of the matrix equalizer computational device.

3. The method of claim 2, wherein selecting one or more transmit beamsteering codewords from the transmit beamsteering codebook includes determining one selected beamsteering codeword after each step.

4. The method of claim 1, wherein providing the CSI to the input of the matrix equalizer computational device includes providing a plurality of channel estimates $\hat{H}_k$ to the input of the matrix equalizer computational device corresponding to a plurality of sub-carriers k in an Orthogonal Frequency Division Modulation (OFDM) system;

wherein the output of the beamsteering calculation performed by the matrix equalizer computational device in response to the CSI provided to the input of the matrix equalizer computational device includes norms of vectors in each of the channel estimates $\hat{H}_k$;

wherein selecting one or more transmit beamsteering codewords from the transmit beamsteering codebook includes selecting one transmit beamsteering codeword from the transmit beamsteering codebook based on maximum norm corresponding to one of the channel estimates $\hat{H}_k$.

5. The method of claim 4, wherein the matrix equalizer computational device applies an iterative QR decomposition to the plurality of channel estimates $\hat{H}_k$; and wherein the method further comprises retrieving norms of vectors in each of the channel estimates $\hat{H}_k$ from an R memory of the matrix equalizer computational device, wherein the R memory is for storing data associated with an upper triangular matrix R resulting from the iterative QR decomposition.

6. The method of claim 1, further comprising:
receiving a sounding packet via the at least one MIMO channel;
applying the equalizer to the sounding packet using the matrix equalizer computational device; and
determining the CSI based on the received sounding packet;
wherein providing the CSI to the input of the matrix equalizer computational device when the matrix equalizer computational device is not needed for matrix equalization comprises providing the CSI to the input of the matrix equalizer computational device after applying the equalizer to the sounding packet and before applying the equalizer to an immediate subsequent packet to be transmitted via the at least one MIMO channel or received via the at least one MIMO channel.

7. The method of claim 6, wherein selecting one or more transmit beamsteering codewords is performed after applying the equalizer to the sounding packet and before applying the equalizer to the immediate subsequent packet to be transmitted via the at least one MIMO channel or received via the at least one MIMO channel.

8. The method of claim 6, wherein an indication of the selected one or more transmit beamsteering codewords is transmitted in the immediate subsequent packet.

9. The method of claim 1, further comprising:
receiving a packet via the at least one MIMO channel, wherein the packet includes the CSI;
applying the equalizer to the packet including the CSI using the matrix equalizer computational device;
wherein providing the CSI to the input of the matrix equalizer computational device when the matrix equalizer computational device is not needed for matrix equalization comprises providing the CSI to the input of the matrix equalizer computational device after applying the equalizer to the packet including the CSI and before applying the equalizer to an immediate subsequent packet to be transmitted via the at least one MIMO channel or received via the at least one MIMO channel.

10. The method of claim 9, wherein selecting one or more transmit beamsteering codewords is performed after applying the equalizer to the packet including the CSI and before applying the equalizer to the immediate subsequent packet to be transmitted via the at least one MIMO channel or received via the at least one MIMO channel.

11. The method of claim 9, further comprising transmitting the immediate subsequent packet by beamsteering based on the selected one or more transmit beamsteering codewords.

12. The method of claim 1, further comprising calculating one or more signal-to-noise ratio (SNR) measurements based on output generated by the matrix equalizer computational device in response to the CSI provided to the input of the matrix equalizer computational device.

13. The method of claim 1, wherein the CSI is provided to the input of the matrix equalizer computational device during a time gap between a first matrix equalization calculation by the matrix equalizer computational device and a second matrix calculation by the matrix equalizer computational device.

14. The method of claim 1, wherein the matrix computation circuitry comprises matrix decomposition circuitry.

15. An apparatus, comprising:
a matrix equalizer configured to apply an equalizer to a signal i) to be transmitted via at least one MIMO channel or ii) received via the at least one MIMO channel, wherein the matrix equalizer includes matrix computation circuitry utilized for at least one of 1) generating the equalizer, or 2) applying the equalizer to the signal;
a multiplexer coupled to an input of the matrix equalizer, the multiplexer to select either i) data on which equalization is to be applied or ii) channel state information (CSI) to be provided to the input of the matrix equalizer; and
codeword selection logic circuitry coupled to an output of the matrix equalizer, the codeword selection logic circuitry to generate an indication of one or more selected beamsteering codewords from a codebook based on an output of a beamsteering calculation performed by reusing the matrix computation circuitry of the matrix equalizer when the matrix equalizer is not needed for equalization purposes.

16. The apparatus of claim 15, wherein the matrix equalizer comprises a QR decomposition processor; and
wherein the multiplexer is coupled to the QR decomposition processor.

17. The apparatus of claim 16, wherein the QR decomposition processor comprises:
a Q memory;
an R memory; and
one or more coordinate rotation digital calculation (CORDIC) engines each having a plurality of CORDIC calculators.

18. The apparatus of claim 17, wherein at least one CORDIC engine implements a plurality of virtual CORDIC engines.

19. The apparatus of claim 15, wherein the codeword selection logic circuitry is configured to:
determine selected beamsteering codewords in a plurality of steps, and control CSI provided to the matrix equalizer so that, at each step after a first step, a subset of the CSI provided at the previous step is provided to the matrix equalizer.

20. The apparatus of claim 19, wherein the codeword selection logic circuitry is configured to determine one selected beamsteering codeword after each step.

21. The apparatus of claim 15, wherein the CSI is applied to the matrix equalizer, the CSI including a plurality of channel estimates $\hat{H}_k$ corresponding to a plurality of sub-carriers k in an Orthogonal Frequency Division Modulation (OFDM) system;
   wherein output generated by the matrix equalizer in response to the CSI applied to the matrix equalizer includes norms of vectors in each of the channel estimates $\hat{H}_k$;
   wherein the codeword selection logic circuitry is configured to select one beamsteering codeword from the codebook based on maximum norm corresponding to one of the channel estimates $\hat{H}_k$.

22. The apparatus of claim 21, wherein the matrix equalizer applies an iterative QR decomposition to the plurality of channel estimates $\hat{H}_k$; and
   wherein the codeword selection logic circuitry is configured to retrieve the norms of vectors in each of the channel estimates $\hat{H}_k$ from an R memory of the matrix equalizer, wherein the R memory is for storing data associated with an upper triangular matrix R resulting from the iterative QR decomposition.

23. The apparatus of claim 15, wherein the matrix equalizer includes a P matrix processor to adjust for a preamble steering matrix P applied by a transmitter, wherein the apparatus further comprises
   an additional multiplexer coupled to the P matrix processor, the additional multiplexer to select between a matrix corresponding to the preamble steering matrix P and an identity matrix I;
   wherein the P matrix processor is configured to calculate one or more signal-to-noise ratio (SNR) measurements based on output generated by the matrix equalizer in response to CSI applied to the matrix equalizer and in response to the matrix I.

24. A method of wirelessly receiving a first information signal and transmitting a second information signal within a communication system having a transmitter with a plurality of transmission antennas and one or more receivers, the method comprising:
   selecting the first information signal for an input of a matrix equalizer computational device of a matrix equalizer;
   providing the first information signal to the input of the matrix equalizer computational device;
   applying an equalizer to the first information signal using matrix computation circuitry of the matrix equalizer computational device;
   receiving channel state information (CSI);
   selecting the CSI for the input of the matrix equalizer computational device at a time when the matrix computation circuitry of the matrix equalizer computational device is not needed for matrix equalization;
   when CSI is selected to be provided to the input of the matrix equalizer computational device:
      providing the CSI to the input of the matrix equalizer computational device,
      performing a beamsteering calculation by reusing the matrix computation circuitry of the matrix equalizer computational device, wherein the beamsteering calculation is based on the CSI, and
      selecting one or more transmit beamsteering codewords from a transmit beamsteering codebook based on an output of the beamsteering calculation performed by the matrix equalizer computational device in response to the CSI provided to the matrix equalizer computational device;
   modulating the second information signal to produce a modulated signal;
   providing the modulated signal to the plurality of transmission antennas for transmission to the one or more receivers; and
   controlling the transmission of the modulated signal via the transmission antennas using the selected beamsteering codewords.

25. A wireless transceiver for transmitting an information signal to a plurality of receiver antennas associated with one or more receivers, the wireless transceiver comprising:
   a matrix equalizer configured to apply an equalizer to a signal to be transmitted via at least one MIMO channel or received via the at least one MIMO channel, wherein the matrix equalizer includes matrix computation circuitry utilized for at least one of 1) generating the equalizer, or 2) applying the equalizer to the signal;
   a multiplexer coupled to an input of the matrix equalizer, the multiplexer to select between i) providing the information signal to the input of the matrix equalizer or ii) providing channel state information (CSI) to the input of the matrix equalizer; and
   codeword selection logic circuitry coupled to an output of the matrix equalizer, the codeword selection logic circuitry to generate an indication of one or more selected beamsteering codewords from a codebook based on an output of the beamsteering calculation performed by the matrix computation circuitry of the matrix equalizer in response to the CSI being provided to the input of the matrix equalizer;
   a steering matrix calculation unit that determines a steering matrix using the selected beamsteering codewords;
   a signal modulator coupled to the matrix equalizer and adapted to modulate the information signal to produce a modulated signal;
   a multiplicity of transmission antennas;
   a beamforming network coupled between the signal modulator and the multiplicity of transmission antennas; and
   a controller coupled to the beamforming network to control the beamforming network using the steering matrix so as to produce a transmit gain pattern having one or more high gain lobes when the modulated signal is transmitted via the multiplicity of transmission antennas.

* * * * *